US008706685B1

(12) United States Patent
Smith et al.

(10) Patent No.: US 8,706,685 B1
(45) Date of Patent: Apr. 22, 2014

(54) ORGANIZING COLLABORATIVE ANNOTATIONS

(75) Inventors: Brent Russell Smith, Redmond, WA (US); Tom Killalea, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 605 days.

(21) Appl. No.: 12/260,764

(22) Filed: Oct. 29, 2008

(51) Int. Cl.
*G06F 17/30* (2006.01)

(52) U.S. Cl.
USPC .......................................... 707/608

(58) Field of Classification Search
USPC .......................................... 715/230
See application file for complete search history.

(56) References Cited

U.S. PATENT DOCUMENTS

| | | | |
|---|---|---|---|
| 5,337,407 A | 8/1994 | Bates et al. | |
| 5,764,345 A | 6/1998 | Fladd et al. | |
| 5,960,173 A | 9/1999 | Tang et al. | |
| 6,714,791 B2 | 3/2004 | Friedman | |
| 7,076,546 B1 | 7/2006 | Bates et al. | |
| 7,103,848 B2 | 9/2006 | Barsness et al. | |
| 7,107,533 B2 | 9/2006 | Duncan et al. | |
| 7,246,118 B2 | 7/2007 | Chastain et al. | |
| 7,257,769 B2 | 8/2007 | Caspi | |
| 7,418,656 B1 | 8/2008 | Petersen | |
| 7,512,653 B2 | 3/2009 | Krishnasamy et al. | |
| 7,543,213 B2 | 6/2009 | Lin | |
| 7,543,237 B2 | 6/2009 | Kontny et al. | |
| 7,669,213 B1 | 2/2010 | Wick et al. | |
| 7,779,347 B2 | 8/2010 | Christiansen et al. | |
| 7,921,309 B1 | 4/2011 | Isbister et al. | |
| 8,261,182 B1 | 9/2012 | Petersen | |
| 8,436,911 B2 | 5/2013 | Leebow | |
| 2001/0007980 A1 | 7/2001 | Ishibashi et al. | |
| 2002/0035697 A1 | 3/2002 | McCurdy et al. | |
| 2002/0107759 A1 | 8/2002 | An | |
| 2002/0120635 A1 | 8/2002 | Joao | |
| 2002/0152215 A1 | 10/2002 | Clark et al. | |
| 2003/0084404 A1 | 5/2003 | Dweck et al. | |
| 2004/0008970 A1 | 1/2004 | Junkersfeld et al. | |
| 2004/0098275 A1 | 5/2004 | Hubert | |
| 2004/0098280 A1 | 5/2004 | Hubert | |
| 2004/0261016 A1 * | 12/2004 | Glass et al. | 715/512 |
| 2005/0108556 A1 | 5/2005 | DeMello et al. | |
| 2005/0132281 A1 | 6/2005 | Pan et al. | |
| 2005/0193330 A1 | 9/2005 | Peters | |
| 2006/0071754 A1 | 4/2006 | Tofts et al. | |
| 2006/0075205 A1 | 4/2006 | Martin et al. | |
| 2006/0085735 A1 * | 4/2006 | Shimizu | 715/512 |

(Continued)

OTHER PUBLICATIONS

Fish et al.,"Quilt: a collaborative tool for cooperative writing", 1998, ACM, pp. 30-pp. 37.

(Continued)

*Primary Examiner* — Cheryl Lewis
*Assistant Examiner* — Alexander Khong
(74) *Attorney, Agent, or Firm* — Lee & Hayes, PLLC

(57) ABSTRACT

Organizing collaborative annotations of digital items is described. In a particular embodiment, a server system receives a filter request from a client device to filter a plurality of annotations according to criteria included in the filter request. The plurality of annotations is stored at an annotations database coupled to the server system. The server system sends filter results to the client device based upon annotations matching the criteria of the filter request. The annotations may be filtered based on tags associated with respective annotations, where the tags categorize the respective annotations.

36 Claims, 11 Drawing Sheets

(56) References Cited

U.S. PATENT DOCUMENTS

| | | | |
|---|---|---|---|
| 2006/0098900 A1 | 5/2006 | King et al. | |
| 2006/0161578 A1 | 7/2006 | Siegel et al. | |
| 2007/0055926 A1* | 3/2007 | Christiansen et al. | 715/512 |
| 2007/0078965 A1 | 4/2007 | Shimamura et al. | |
| 2008/0092181 A1* | 4/2008 | Britt | 725/87 |
| 2008/0098294 A1* | 4/2008 | Le | 715/230 |
| 2008/0154908 A1* | 6/2008 | Datar et al. | 707/10 |
| 2008/0168073 A1 | 7/2008 | Siegel et al. | |
| 2008/0195657 A1* | 8/2008 | Naaman et al. | 707/104.1 |
| 2008/0201632 A1* | 8/2008 | Hong et al. | 715/230 |
| 2008/0222295 A1 | 9/2008 | Robinson et al. | |
| 2008/0227074 A1 | 9/2008 | Johnson | |
| 2009/0005990 A1 | 1/2009 | Anderson et al. | |
| 2009/0157522 A1 | 6/2009 | Srinivasan et al. | |
| 2009/0204882 A1 | 8/2009 | Hollander et al. | |
| 2009/0210244 A1 | 8/2009 | Koister et al. | |
| 2009/0271381 A1 | 10/2009 | Beezer et al. | |
| 2009/0287714 A1* | 11/2009 | Vasudevan et al. | 707/10 |
| 2010/0057714 A1 | 3/2010 | Miedema | |
| 2010/0070845 A1* | 3/2010 | Facemire et al. | 715/230 |
| 2010/0205105 A1 | 8/2010 | Robertson et al. | |
| 2010/0278453 A1 | 11/2010 | King | |
| 2011/0087955 A1 | 4/2011 | Ho et al. | |
| 2011/0173141 A1 | 7/2011 | Campbell et al. | |
| 2011/0196863 A1 | 8/2011 | Marcucci et al. | |
| 2011/0225192 A1 | 9/2011 | Imig et al. | |
| 2011/0282866 A1 | 11/2011 | Erickson et al. | |
| 2012/0036423 A1 | 2/2012 | Haynes, II et al. | |
| 2012/0084634 A1 | 4/2012 | Wong et al. | |
| 2012/0150859 A1 | 6/2012 | Hu | |
| 2012/0221938 A1 | 8/2012 | Patterson et al. | |
| 2012/0254304 A1 | 10/2012 | Anbalagan et al. | |
| 2013/0021281 A1 | 1/2013 | Tse et al. | |
| 2013/0104028 A1 | 4/2013 | Murray et al. | |
| 2013/0166471 A1 | 6/2013 | Fukuda Kelley et al. | |

OTHER PUBLICATIONS

International Search Report, Application No. PCT/US/08/57829, filed Mar. 21, 2008, 2 pages.

U.S. Appl. No. 12/240,842, Curtis, Michael G.

"Book Clubs Barnes and Noble", retrievced from: http://www.barnesandnoble.com/bookclubs/ on Jan. 30, 2009, 1 page.

"Borders Book Club Resources", retreived from: http://www.bordersmedia.com/bookclubs/default.asp on Jan. 30, 2009, 3 pages.

"Book clubs on and offline", retreived from: http://www.chistell.com/book_clubs.htm on Jan. 30, 2009. 3 pages.

"General Interest Online Book Clubs and Web-based Book Discussion", retrieved from: http://www.book-clubs-resource.com/online/general.php on Jan. 30, 2009, 3 pages.

"Internet Book Clubs and Discussion Groups", retrieved from: http://www.monroe.lib.in.us/fiction/inbookclubs.html on Jan. 30, 2009, 1 page.

"Oprah's Book Club", retrieved from: http://www.oprah.com/entity/oprahsbookclub on Jan. 30, 2009, 1 page.

"Reader's Circle Author chats", retrieved from: http://www.randomhouse.com/rhpg/rc/author_chats/index.html on Jan. 30, 2009, 1 page.

"Reader's Paradise Forum—Garden Web", retrieved from: http://glyphs.gardenweb.com/forums/paradise/ on Jan. 30, 2009, 1 page.

"Salon Table Talk—Books ", retrieved from: http://tabletalk.salon.com/webx?13@114.sxcAajHRfod.0@.ee6ced0 on Jan. 30, 2009, 4 pages.

SeniorNet—SeniorNet Books & Literature, retreived from: http://www.seniornet.org/jsnet/index.php?option=com_content&task=view&id=363&Itemid=37 on Jan. 30, 2009, 2 pages.

"ShakespeareHigh.com" Billy's book club, retrieved from: http://www.shakespearehigh.com/cafeteria/index.php?PHPSESSID=a5d84904c94dbba0197c4724a1344c91&board=57.0 on Jan. 30, 2009, 1 page.

"The Bookies: An online book discussion group", retrieved from: http://www.geocities.com/bookiestoo/ on Jan. 30, 2009, 1 page.

"Vintage Reading Group Center", retrieved from: http://www.randomhouse.com/vintage/read/rgg.html on Jan. 30, 2009, 1 page.

"Yahoo! Groups: Directory : Reading Groups", retrieved from : http://dir.groups.yahoo.com/dir/Entertainment__Arts/Humanities/Books_and_Writing/Reading_Groups on Jan. 30, 2009, 2 pages.

U.S. Appl. No. 12/240,842, filed Sep. 29, 2008, Curtis, "Facilitating Discussion Group Formation and Interaction".

U.S. Appl. No. 12/260,764 , filed Oct. 29,2008, Smith et al., "Organizing Collaborative Annotations".

Non-Final Office Action for U.S. Appl. No. 12/260,713, mailed on Feb. 23, 2011, Brent Russell Smith et al, "Providing Presence Information Within Digital Items", 15 pages.

Final Office Action for U.S. Appl. No. 12/260,713, mailed on Jul. 3, 2012, Brent Russell Smith et al, "Providing Presence Information Within Digital Items", 19 pages.

U.S. Appl. No. 12/260,713, filed Oct. 29, 2008, Smith et al., "Providing Presence Information Within Digital Items" 73 pages.

Kolovshi et al., "Towards E-learning via the Semantic Web", International Conference on Computer Systems and Technologies, 2003, 6 pages.

Office action for U.S. Appl. No. 13/077,699, mailed on Nov. 8, 2012, Lynnes et al., "Tagging Annotations of Electronic Books", 14 pages.

Shelburn, "E-book usage in an academic library: User attitudes and behaviors", Elsevier Inc., Library Collections, Acquisitions, & Technical Services 33, 2009, 14 pages.

Li et al., "Towards Effective Browsing of Large Scale Social Annotations", International World Wide Web Conference Committee, 2007, 10 pages.

Office action for U.S. Appl. No. 13/077,699, mailed on Apr. 4, 2013, Lynnes et al., "Tagging Annotations of Electronic Books", 18 pages.

Wolfe, "Annotation technologies: A software and research review", Elsevier Science Inc., Computers and Composition 19, 2002, 27 pages.

Office Action for U.S. Appl. No. 13/077,699, mailed on Nov. 21, 2013, Brett N. Lynnes, "Tagging Annotations of Electronic Books," 15 pages.

Office Action for U.S. Appl. No. 12/260,713, mailed on Sep. 25, 2013, Brent Russell Smith, "Providing Presence Information Within Digital Items," 19 pages.

* cited by examiner

900

902

Romeo & Juliet
William Shakespeare

But, soft! What light through yonder window breaks!
It is the east, and Juliet is the sun! –
Arise, fair sun, and kill the envious moon,
Who is already sick and pale with grief,
That thou her maid art far more fair than she:
Be not her maid, since she is envious;
Her vestal livery is but sick and green,
And none but fools do wear it; cast it off. –
It is my lady; O, it is my love:
O, that she knew she were! –
She speaks, yet she says nothing: What of that?
Her eye discourses, I will answer it. –
I am too bold, 'tis not to me she speaks:
Two of the fairest stars in all the heaven,

904

ANNOTATIONS

This is my favorite part...

Shakespeare at his finest...

I'm not sure I understand what he's talking about here...

906

VISIT STRATFORD UPON AVON
HOME OF WILLIAM SHAKESPEARE
CLICK HERE FOR DETAILS

FIG. 9

ORGANIZING COLLABORATIVE ANNOTATIONS

BACKGROUND

Electronic distribution of media to consumers has become prevalent. For example, consumers have the ability to download digital items including audio media, video media, and text based media, such as eBooks. Consumers often share information related to media online via reviews and commentary posted on blogs, online marketplace websites, and social networking websites. Thus, a large amount of supplemental material is available with respect to digital items available to consumers. However, as the number of digital items available to consumers increases and as the amount of information related to each particular digital item increases, retrieving specific information relating to a digital item and organizing information relating to a number of digital items may become time consuming and inefficient.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 9 is a pictorial diagram of an illustrative user interface configured to display annotations related to a digital item and to display corresponding advertisements.

DETAILED DESCRIPTION

Figure 1:
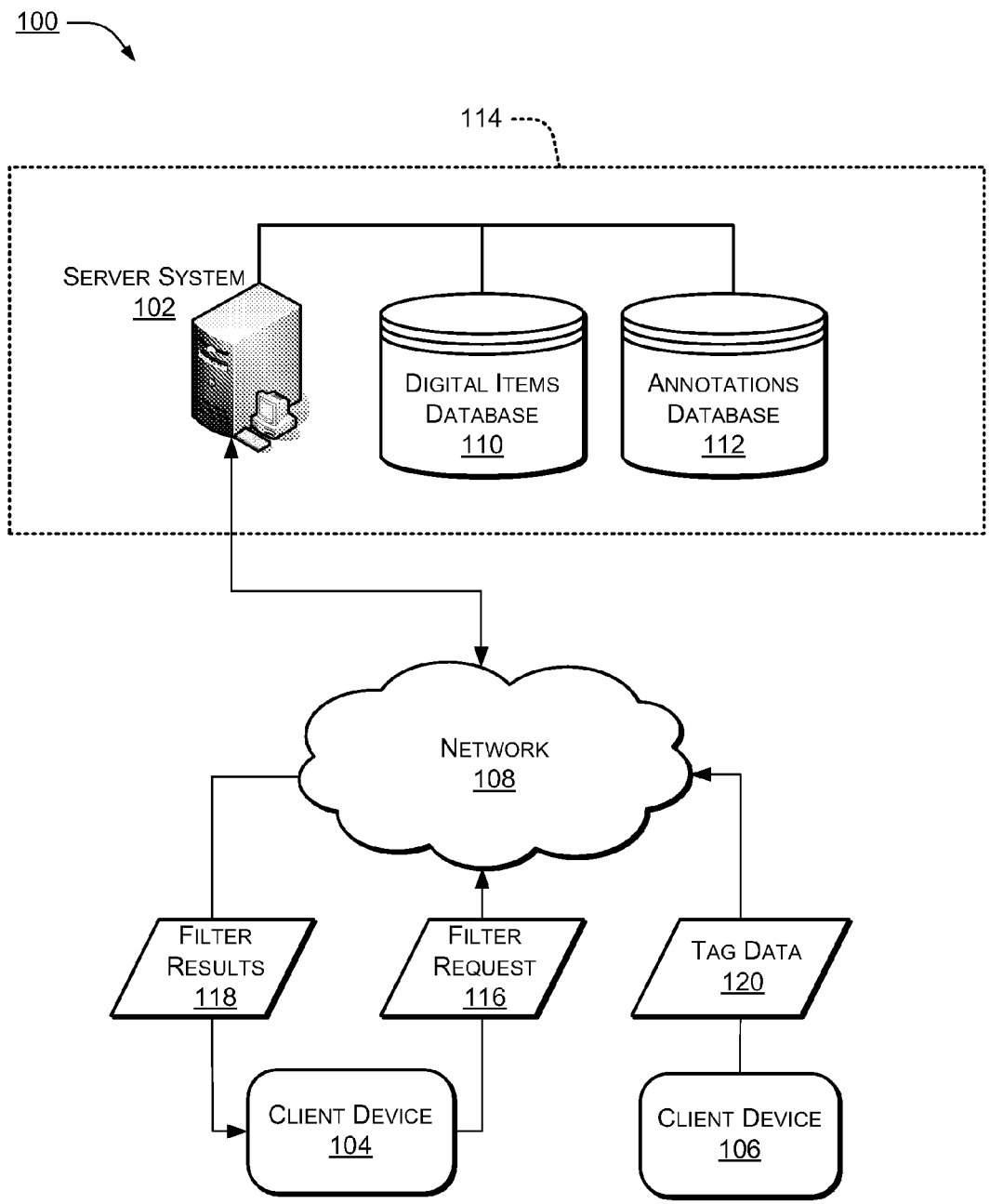
FIG. 1 is a pictorial diagram of an illustrative computing environment that includes a server system and a number of client systems communicatively connected via a network.

According to one illustrative implementation, this disclosure sets forth functionality for providing, organizing, and filtering collaborative annotations of a digital item. The functionality may be manifested in various systems, modules, computer readable media, data structures, methods, and other forms.

Overview

This disclosure describes organizing collaborative annotations of digital items. Annotations relating to a digital item may be provided by a number of commentators. A commentator providing an annotation of a digital item may include the creator of the digital item, such as the original author of a book or article. Alternatively, a commentator providing an annotation of a digital item may include a third party, such as a publisher of the digital item, a distributor of the digital item, a consumer, or another individual. Annotations may provide supplemental material relating to the digital item. For example, an annotation may include a personal impression or comment relating to the digital item, editing of the digital item to correct errors, revisions of the digital item, highlighting of the digital item, audio and/or visual information relating to the digital item, or a combination thereof. The annotation may relate to certain parts of the digital item, to the entire digital item, or a combination thereof. The annotations may be used for educational purposes, social purposes, or a combination thereof.

Over time, large numbers of annotations may accumulate for the increasing number of digital items available to consumers. Accessing and organizing the annotations associated with a number of digital items and associated with a number of different commentators can become inefficient and time consuming, which may lead to frustration on the part of consumers. Consumer frustration may result in decreased activity relating to digital items, which may affect usage and sales of digital items.

Techniques to filter annotations of digital items can help to make information associated with one or more digital items easily accessible to consumers. Additionally, annotations of digital items can be organized using tags that categorize the annotations. Providing efficient techniques to filter and organize annotations improves a consumer's experience relating to digital items and increases consumer activity relating to digital items.

Throughout this disclosure, techniques for collaboratively annotating digital items, tagging annotations, filtering annotations, and searching annotations are described in the context of annotations added to electronic books (eBooks) using electronic reader devices. However, the techniques described herein are applicable to annotations of other digital items (textual, audio, and/or visual), made using other electronic devices, such as a personal computer, a laptop computer, a personal digital assistant (PDA), a portable gaming device, a wireless communication device, a set-top box, or a game console.

Illustrative Computing Environment

FIG. 1 is a pictorial diagram of an illustrative computing environment 100 that includes a server system 102 and a number of client devices 104, 106 communicatively connected via a network 108. Although two client devices are shown in FIG. 1, the computing environment 100 may include any number of client devices. The network 108 may include a local area network, a wide area network, such as a wireless communications network or a public switched telephone network (PSTN), a collection of networks, a public Internet Protocol (IP) network, a private IP network, or a combination thereof. The computing environment 100 also includes a digital items database 110 and an annotations database 112. The digital items database 110 and the annotations database 112 may be integrated with the server system 102 or otherwise communicatively coupled with the server system 102. In an illustrative embodiment, the digital items database 110 and the annotations database 112 may include one or more CD-RW/DVD-RW drives, hard disk drives, tape drives, other storage devices, or combinations thereof, that are utilized to store digital content and information, such as annotations and digital items. The server system 102, separately or together with the digital items database 110 and the annotations database 112, may provide an online service 114 that can receive and distribute annotations as well as the digital items to which the annotations pertain.

The first client device 104 and the second client device 106 may include a personal computer, an electronic reader device, a laptop computer, a personal digital assistant (PDA), a portable gaming device, a wireless communication device, such as a smart phone or mobile handset, a set-top-box, a game console, or any combination thereof. In addition, to communicating with each other via the network 108, the first client device 104 and the second client device 106 may communicate via peer-to-peer wired or wireless connections. As will be described with regard to the particular implementations shown herein, the server system 102 is configured to exchange data and information, including digital items and annotations thereof, among the client devices 104, 106. In some circumstances, the server system 102 may be associated with a merchant, such as an online retailer authorized to provide a service for selling and distributing digital items to consumers. However, in other examples, the server system 102 may be associated with a site facilitating sale or distribution of items by other sellers, a social networking site, an academic or educational site, or any other online site.

The digital items database 110 stores electronic media files comprising a plurality of digital items that may be accessible to the client devices 104, 106 via the network 108. For example, the online service 114 may sell and distribute digital items to consumers via the client devices 104, 106. A "digital item" as used herein may include any type of content that can be stored and distributed in digital form. For example, digital items may include without limitation, text content, text formatting, image content, audio content, video content, hypertext protocol content, and so on, or any combination of these kinds of content. Some specific examples of digital items include, without limitation, all forms of textual information, such as books, magazines, newspapers, newsletters, periodicals, journals, reference materials, telephone books, textbooks, anthologies, sheet music, proceedings of meetings, forms, directories, maps, manuals, guides, references, articles, reports, documents, etc., and all forms of audio and audiovisual works such as music, multimedia presentations, audio books, movies, pictures, photographs, or any combination thereof. Additionally, "digital item" may refer to a portion of a larger work, such as a chapter of a book, or a song of an album, etc. Further, a digital item may refer to a larger compilation of component items which are related in any manner. For instance, an item may refer to multiple issues of a magazine in a particular year.

Digital items stored in the digital items database 110 may be accessed by the client devices 104, 106 via the server system 102. In an illustrative embodiment, a client device, such as the client device 104, sends a request to access a particular digital item. The request may relate to accessing all of the content of the digital item or a specified portion of the content of the digital item. In one example, in response to receiving a request to access a digital item, the server system 102 sends data relating to a portion of the digital item that can be viewed on a display of the client device 104. To illustrate, the server system 102 may send data related to a webpage including the text of a portion of an eBook to the client device 104. As a user of the client device 104 navigates through the content of a digital item, the client device 104 may send additional requests to view other portions of the digital item.

In turn, the server system 102 may send content of the digital item relating to the additional requests for each portion of the digital item, such that the content of the digital item provided to the user via the client device 104 is continuously updated. In another example, the server system 102 may send all of the data related to the content of the digital item to the client device 104 to be downloaded and stored in memory of the client device 104. Annotations associated with the digital item may also be provided to the client device 104 by the server system 102 for each portion of the digital item sent to the client device 104.

The annotations database 112 stores data related to annotations of digital items stored in the digital items database 110. For example, annotation data may include an annotation, metadata associated with the annotation, such as the time that the annotation was entered and/or the client device that sent the annotation to the server system 102, information associated with the commentator of the annotation, such as personal information of the commentator, or a combination thereof. In addition, the annotation data may specify one or more locations or content of a digital item that pertain to a particular annotation. For example, a commentator can indicate that an annotation relates to a designated portion of the digital item, such as certain lines of text or a specified section of a digital item (e.g. a chapter of an eBook, song of an album), or to an entire digital item. In some implementations, the location of an annotation may be expressed by an indicator, such as a page number, character count, offset from the beginning of a digital item, offset from the beginning of a particular section of a digital item, or a combination thereof.

Annotations may be received in a visual form, in an audio form, or a combination thereof. For example, annotations may be expressed via handwriting, text, formatting, such as highlighting, an attachment of image files, an attachment of audio files, an attachment of video files, or a combination thereof. The following examples give several illustrative contexts of annotating a digital item. An annotation, for example, may be a critique or alternatively a summary of a digital item. An annotation may be a separate essay on the same topic presented in the digital item. Annotations may be words, graphs, formulae, files, images, enhancements, etc., provided by a commentator. For example, a commentator may wish to annotate a travel book by providing recent images of locations described in the travel book. For digital items that include audio content, such as music files, commentators can annotate the music files with additional content commenting on the songs, providing background information on the singer or the recording process, alternative lyrics, technical information as to the composition, related musical compositions, etc. In a circumstance where the digital item is a cookbook, for example, commentators may submit alternative ingredients that enhance a recipe, ingredients that make a spicier dish, ingredient substitutions considered to be lower in fat or carbohydrates, etc. In another circumstance, a student or teacher as a commentator may provide a markup of an academic textbook. By way of illustration, an annotation can also be in the form of a link or address to another page, file, or document available to the server system or the client system(s). There is virtually no limitation to the type, form and content of annotations that can be added to a digital item.

In one embodiment, the server system 102 may receive annotations to store in the annotations database 112 via client devices, such as the client devices 104, 106. In addition to, or instead of, storing annotations at the annotations database 112, annotations may be stored locally at the client devices 104, 106. In some instances, annotations may be stored in local memory of the client devices 104, 106, and subsequently transmitted to a remote data store. Annotations may be stored in an annotation file separate from a corresponding digital item, embedded in a data file of the digital item, or otherwise associated with the digital item. Storing an annotation in association with a digital item may be accomplished in any suitable manner, including simply storing the annotation in the annotations database 112 with an indication of the digital item to which the annotation pertains.

A commentator may enter annotations into a client device in a wide variety of formats depending on the software and hardware provided at the client device. In one format, for example, the commentator may operate a keyboard to enter text annotations into the client device. In another format, the commentator may enter graphical annotations, such as handwritten notes or drawings. The graphical annotations may appear in context with regard to the digital item being annotated, for example, in the margins, adjacent to, or superposed over or near particular content in a display of the digital item. Handwritten annotations may be particularly suited where the client device includes a touch sensitive screen that readily accepts handwritten input. In another format, the commentator may annotate a digital item by providing an image file containing an image pertaining to the digital item. Additionally, when the server system 102 receives an annotation of a digital item, the commentator may indicate one or more particular locations or content in the digital item to which the annotation pertains. In some implementations, the commentator may be required to sign in or otherwise submit an identification before the author is allowed to submit annotations to the server system 102.

The server system 102 may also provide annotations to the annotations database 112 based on instructions from an administrator. For example, an administrator utilizing the server system 102 may retrieve notes, commentary, or other information from other electronic sources related to a particular digital item and store this information as an annotation related to the digital item. In one illustration, the administrator may retrieve a review of a book from an electronic source and post the review as an annotation to the book. Further, an administrator utilizing the server system 102 may receive commentary or other information related to a digital item via a communication channel, such as over the phone or via email and manually enter data related to the communication to be stored as an annotation related to the digital item. An administrator may have access to the annotations database 112 via a computing device coupled to the server system 102 or via a web interface executing on the server system 102. In another illustration, the server system 102 may be configured to automatically search online third-party databases and retrieve information relating to a digital item that can be specified as an annotation of a digital item.

Furthermore, visual indicators may be included in a digital item to identify particular content having annotations. In a textual digital item for example, the indicators may appear as footnotes, graphical icons, symbols, characters, or other indicia that are located with the text. Where the digital item is an audio work or an audiovisual work, an annotation associated with particular content in the digital item may be identified by an indicator in a playback control provided for playback of the digital item. In yet another alternative, a digital item having annotations pertaining to particular content in the digital item may provide a listing of contents for the digital item with indicators in the listing of contents identifying the location of the annotations.

In some circumstances where annotations are associated with particular content in the digital item, the annotations may be presented in a manner such that the annotations are normally hidden and become viewable only when a user positions a cursor or pointer near the particular content in the digital item. Techniques for recognizing the position of a cursor or pointer within a digital item displayed on a screen are known in the art. Additionally, annotations of a digital item may be viewable concurrent with or separate from a display of the digital item.

In an illustrative embodiment, the client device 104 may send a filter request 116 to the server system 102 via the network 108. The filter request 116 may relate to searching for annotations that match specified criteria. In one example, the filter request 116 may relate to searching a particular digital item for certain keywords, searching for a plurality of annotations including certain keywords, or a combination thereof. The criteria of the filter request 116 may relate to identifying annotations associated with a particular commentator. Additionally, the criteria of the filter request 116 may relate to a particular group of people, such as a book group, an educational class, a social networking group, or a combination thereof. The particular group may include one or more commentators providing annotations of digital items. Further, the criteria of the filter request 116 may relate to data associated with one or more commentator, such as a geographic location of one or more commentators, an educational level associated with one or more commentators, a credibility ranking associated with one or more commentators, age of one or more commentators, other personal data relating to one or more commentators, the number of annotations posted by one or more commentators with respect to one or more digital items, or a combination thereof. With respect to the credibility ranking associated with the particular commentator, a commentator can be ranked by other commentators relating to the perceived quality of the annotations submitted by the particular commentator. In one embodiment, the commentator may be ranked according to a number of stars from 5 stars, based on a scale from 1 to 10, or based on a subject ranking, such as "perceptive," "tangential," or "verbose". Additionally, the criteria of the filter request 116 may relate to a language of an annotation or a language of a digital item. In some implementations, the criteria of the filter request 116 may relate to a data format of the annotation. For example, the filter request 116 may relate to identifying textual annotations, audio annotations, video annotations, or a combination thereof. The criteria of the filter request 116 may also include exclusions, such that annotations including certain keywords, associated with commentators in a particular geographic location, annotations associated with a particular tag, and/or annotations associated with one or more other criteria, are excluded from the set of annotations provided to the first client device 104 in response to submitting the filter request 116. For example, the filter request 116 may include the keyword "Hogwarts" and the exclusions "Slytherin," "Seattle," "PDF," and "spoiler". In this way, annotations may be provided in response to the filter request 116 including the term Hogwarts, but not including the term "Slytherin", that are not created by commentators in Seattle, that are not in PDF format, and that are not associated with the tag "spoiler".

Additionally, the criteria of the filter request 116 may relate to one or more ratings associated with each respective annotation, a title of a digital item, a tag associated with certain annotations, a location within a particular digital item (e.g., an introduction, a climax, an anticlimax, a conclusion, a chapter, a section, a page, an epilogue, a table of contents, a forward, an abstract, certain lines of text, etc.), or a combination thereof. The filter request 116 may also relate to filtering out annotations relating to spoilers (i.e., annotations that discuss content located later in the digital item) or filtering annotations based on auto-generated metadata associated with a particular annotation, such as a time related to entering the particular annotation, an identifier indicating a client device sending the particular annotation, an identifier indicating a particular commentator, or a combination thereof.

The filter request 116 may be generated at the first client device 104 before downloading a digital item from the digital items database 110, or while viewing a representation of a digital item. Additionally, the filter request 116 may be generated without downloading or viewing any digital items.

Figure 11:
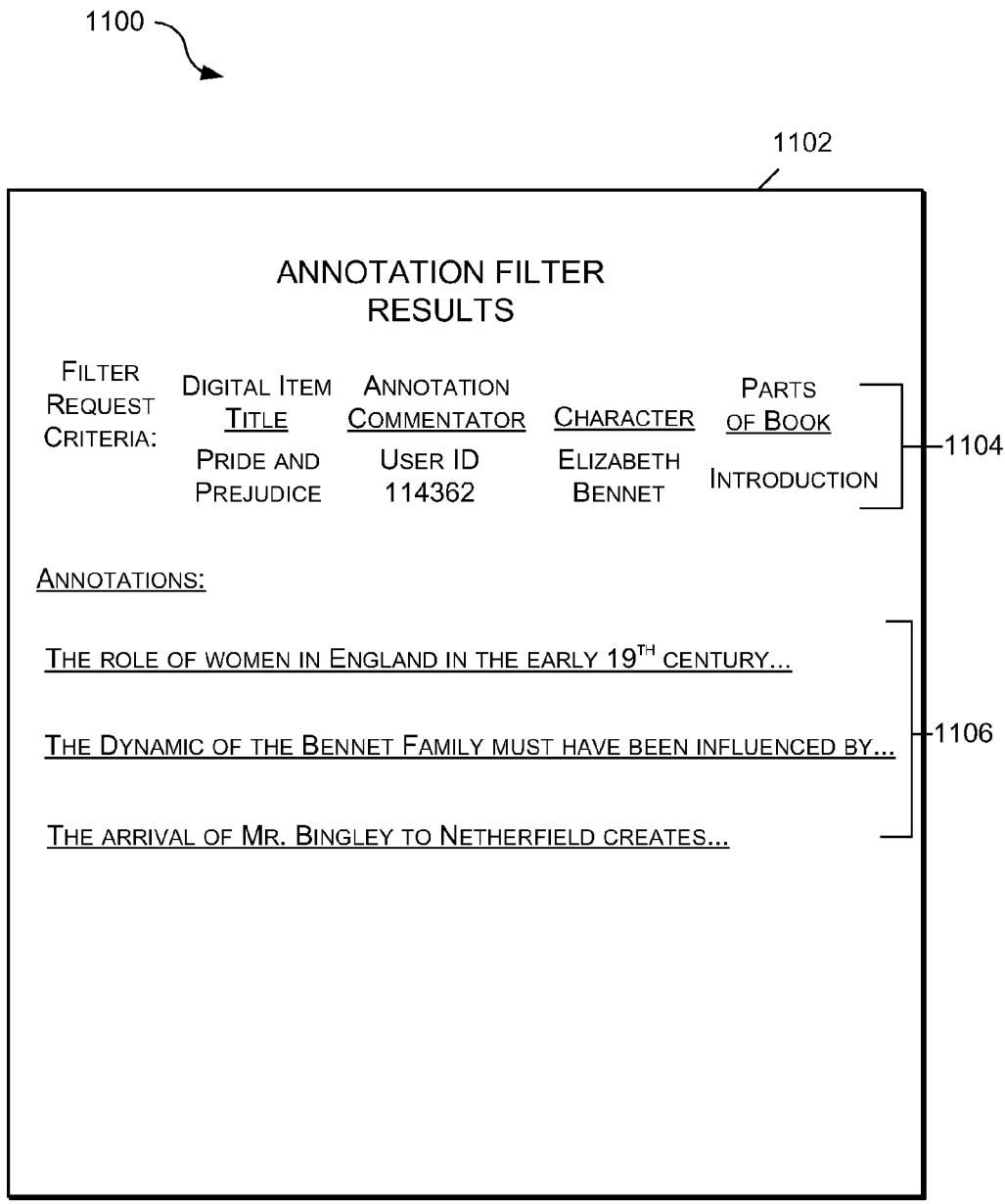
FIG. 11 is a pictorial diagram of an illustrative user interface to provide filter results relating to a filter request.

In response to receiving the filter request 116 from the first client device 104, the server system 102 is configured to search the annotations database 112 for annotations that match the filter criteria included in the filter request 116. After identifying the annotations that match the filter criteria of the filter request 116, the server system 102 compiles data related to the matching annotations and sends filter results 118 to the client device 104. The data associated with the filter results 118 may include information relating to each respective annotation including text of the respective annotation, format of the respective annotation, a location within the digital item associated with the respective annotation, a link to information relating to the respective annotation, formatting of text or other content associated with the respective annotation, such as highlighting, or a combination thereof. The filter results 118 may be provided to a display of the client device 104 via a user interface. An example of a user interface displaying filter results is illustrated in FIG. 11.

In another illustrative embodiment, the second client device 106 sends tag data 120 to the server system 102. The tag data 120 may be related to a tag that categorizes a digital item, a particular annotation, a commentator, a creator of a digital item, or a combination thereof.

Figure 8:
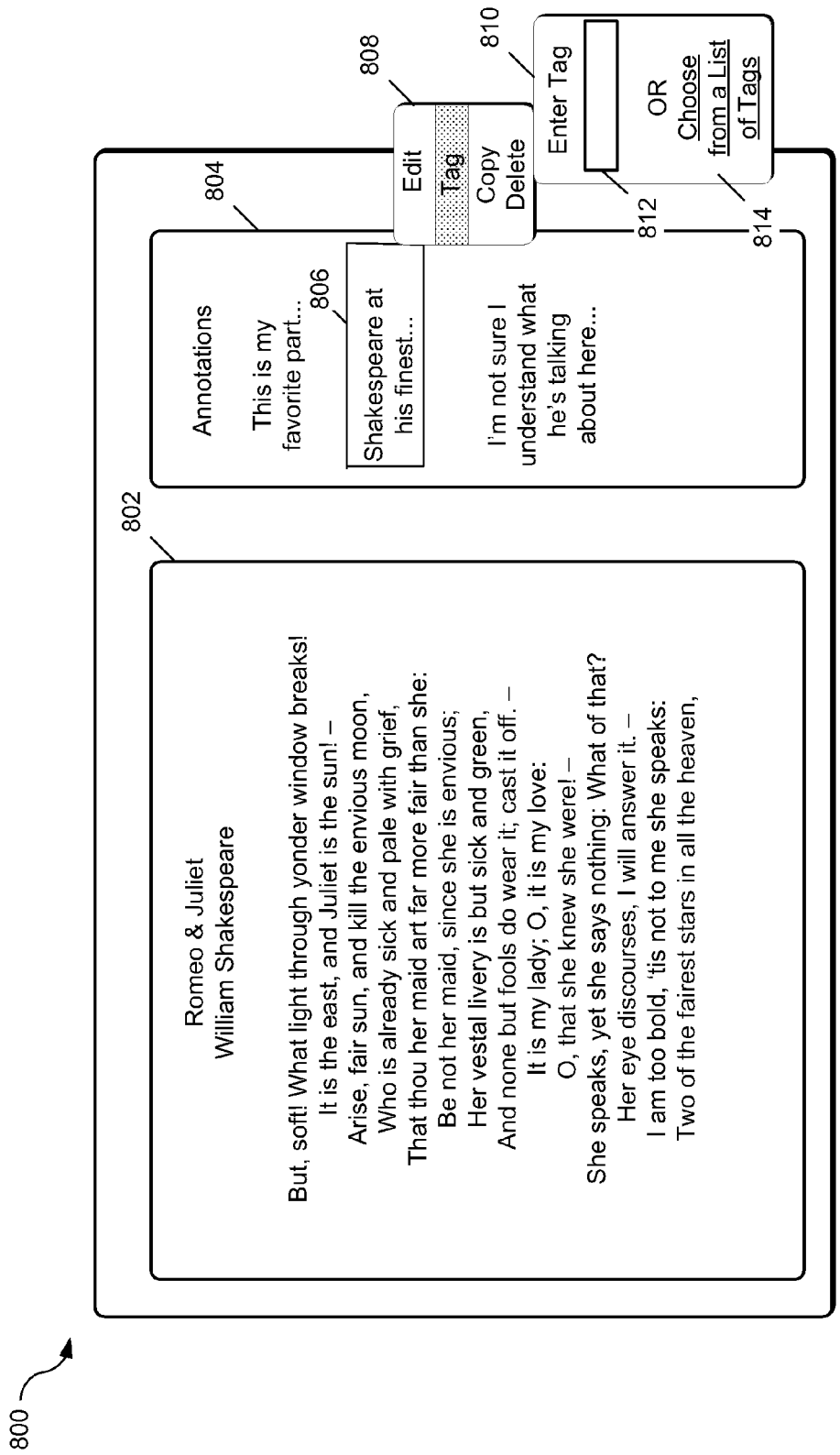
FIG. 8 is a pictorial diagram of an illustrative user interface configured to tag annotations of a digital item.

In a particular embodiment, a tag may include an identifier assigned via the server system 102 to a particular category or label associated with annotations. In one example, an annotation may be tagged according to a predetermined category selected from a list of categories. The predetermined categories may be provided by the online service 114 and relate to common categories, such as "notes," "commentary," "favorable," "unfavorable," or "spoiler." In another example, the tag may be user-specified. The tags may be specified via a user interface provided by the second client device 106. An example of a user interface to specify an annotation tag is illustrated in FIG. 8. After a tag has been specified, the second client device 106 may send the tag data 120 to the server system 102. The tag data 120 may include the tag associated with an annotation, an identifier indicating a client device or a user identification of the user specifying the tag, other metadata associated with the tag, or a combination thereof.

The server system 102 may store the tag data 120 in the annotations database 112. Users of the client devices 104, 106 may filter annotations based on tags stored in association with respective annotations, tags stored in association with annotation commentators, tags stored in association with digital items, or a combination thereof. Additionally, the tag data 120 may be stored in association with an account of a user of the second client device 106, such that the user of the client device 106 can access their particular annotation tags. In an illustrative, non-limiting embodiment, the user of the client device 106 may be able to control access to their annotations, such that their annotations can be publicly accessible or only accessible to certain people. Further, statistics may be accumulated to track the tags associated with the annotations stored in the annotations database 112.

Providing a mechanism for annotation of a digital item and providing a mechanism for distribution of the annotation makes the underlying digital item more useful and valuable by clarifying material in the digital item, updating material, correcting material, adding academic interest or "color" to the material, providing editorial comments to the material, etc. In addition, the opportunity to organize and filter annotations provides opportunities for a user of a client device to identify other people that may be of interest to them and share ideas and opinions regarding content of digital items.

Illustrative Server System

Figure 2:
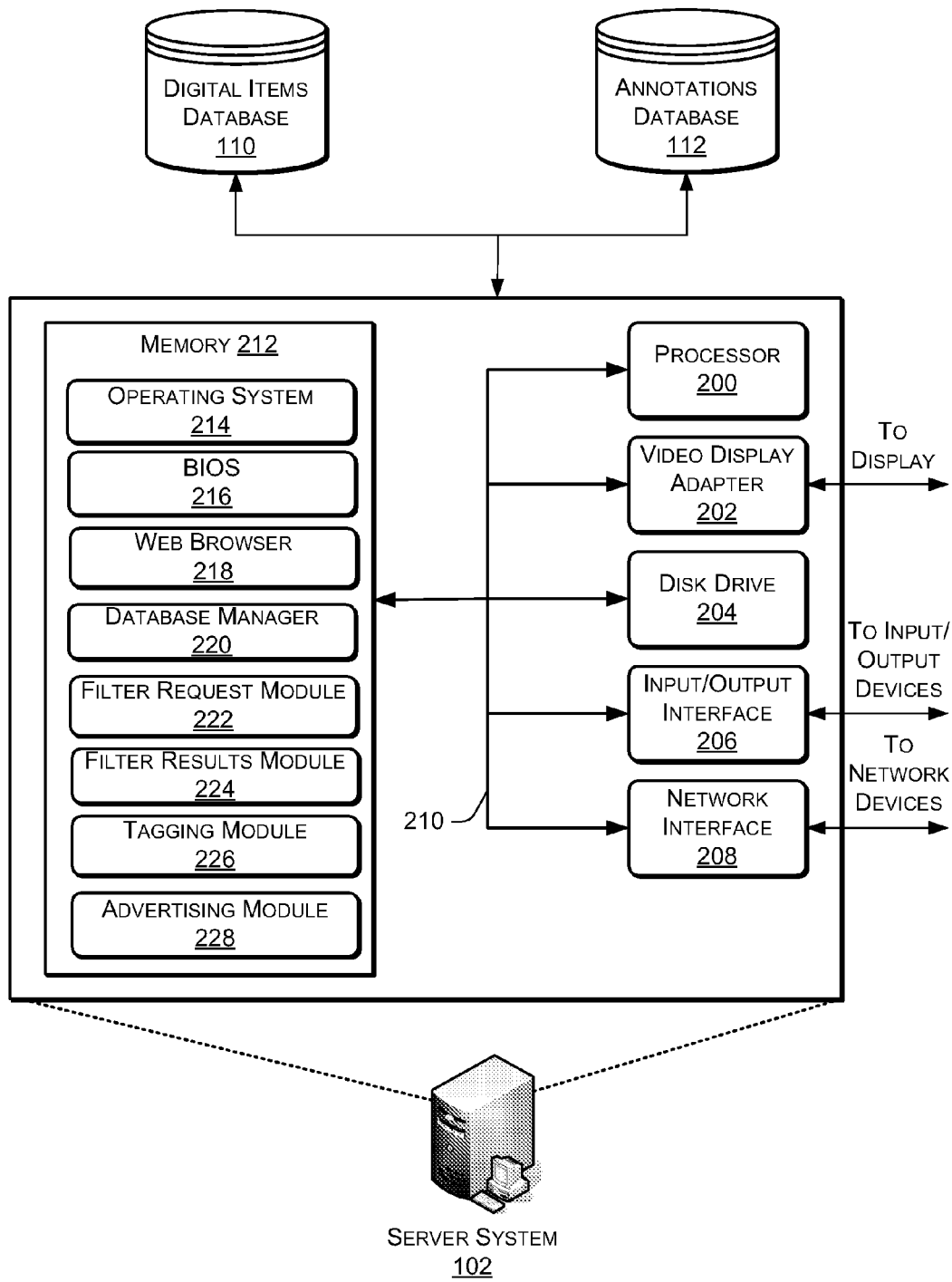
FIG. 2 is a schematic block diagram of an illustrative implementation of a server system that may be used in the computing environment of FIG. 1.

FIG. 2 is a schematic block diagram of an illustrative implementation of a server system, such as the server system 102 of FIG. 1, that may be used to provide collaborative annotations of digital items. The server system 102 includes a processor 200, such as one or more redundant processors, a video display adapter 202, a disk drive 204, an input/output interface 206, a network interface 208, and a memory 212. The processor 200, the video display adapter 202, the disk drive 204, the input/output interface 206, the network interface 208, and the memory 212 may be communicatively coupled to each other by a communication bus 210.

The video display adapter 202 provides display signals to a local display (not shown in FIG. 2) permitting an operator of the server system 102 to monitor and configure operation of the server system 102. The input/output interface 206 likewise communicates with external devices not shown in FIG. 2, such as a mouse, keyboard, scanner, or other input and output devices that can be operated by an operator of the server system 102. The network interface 208 includes hardware, software, or any combination thereof, to communicate with other computing devices. For example, the network interface 208 may be configured to provide communications between the server system 102 and other computing devices, such as the first client device 104 and the second client device 106, via the network 108, as shown in FIG. 1.

The memory 212 generally comprises random access memory (RAM), read-only memory (ROM), flash memory, and/or other volatile or permanent memory. The memory 212 is shown storing an operating system 214 for controlling the operation of the server system 102. A binary input/output system (BIOS) 216 for controlling the low-level operation of the server system 102 is also stored in the memory 212.

The memory 212 additionally stores program code and data for providing network services that allow client devices to exchange information and data files with the server system 102. Accordingly, the memory 212 may store a browser application 218. The browser application 218 comprises computer executable instructions, that, when executed by the processor 200, generate or otherwise obtain configurable markup documents such as web pages. The browser application 218 communicates with a database manager application 220 to facilitate data exchange between the digital items database 110, the annotations database 112, or any combination thereof, and client devices, such as the first client device 104 and the second client device 106 shown in FIG. 1.

Additionally, the memory 212 includes a filter request module 222, a filter results module 224, a tagging module 226, and an advertising module 228. The modules 222-228 may be executable by the processor 200 to implement one or more of the functions of the server system 102. In one embodiment, each of the modules 222-228 may represent instructions embodied in one or more software programs stored in the memory 212. In another embodiment, the modules 222-228 can represent hardware, software instructions, or a combination thereof.

In a particular embodiment, the filter request module 222 is configured to receive filter requests from client devices such as the first client device 104, the second client device 106, via a network such as the network 108 of FIG. 1. The filter request may include one or more criteria to be utilized to search for annotations stored in the annotations database 112. Although the filter request may be received from one client device, the filter request may specify that the filter results are to be sent to a number of client devices.

The filter request can be received while a particular digital item is being viewed via a client device. Additionally, the filter request may accompany a request to download a digital item. In this way, a digital item can be sent to a client device via the server system 102 including data relating to annotations matching the criteria of the filter request. Further, the server system 102 may receive a filter request independent from viewing a digital item or downloading a digital item.

Figure 10:
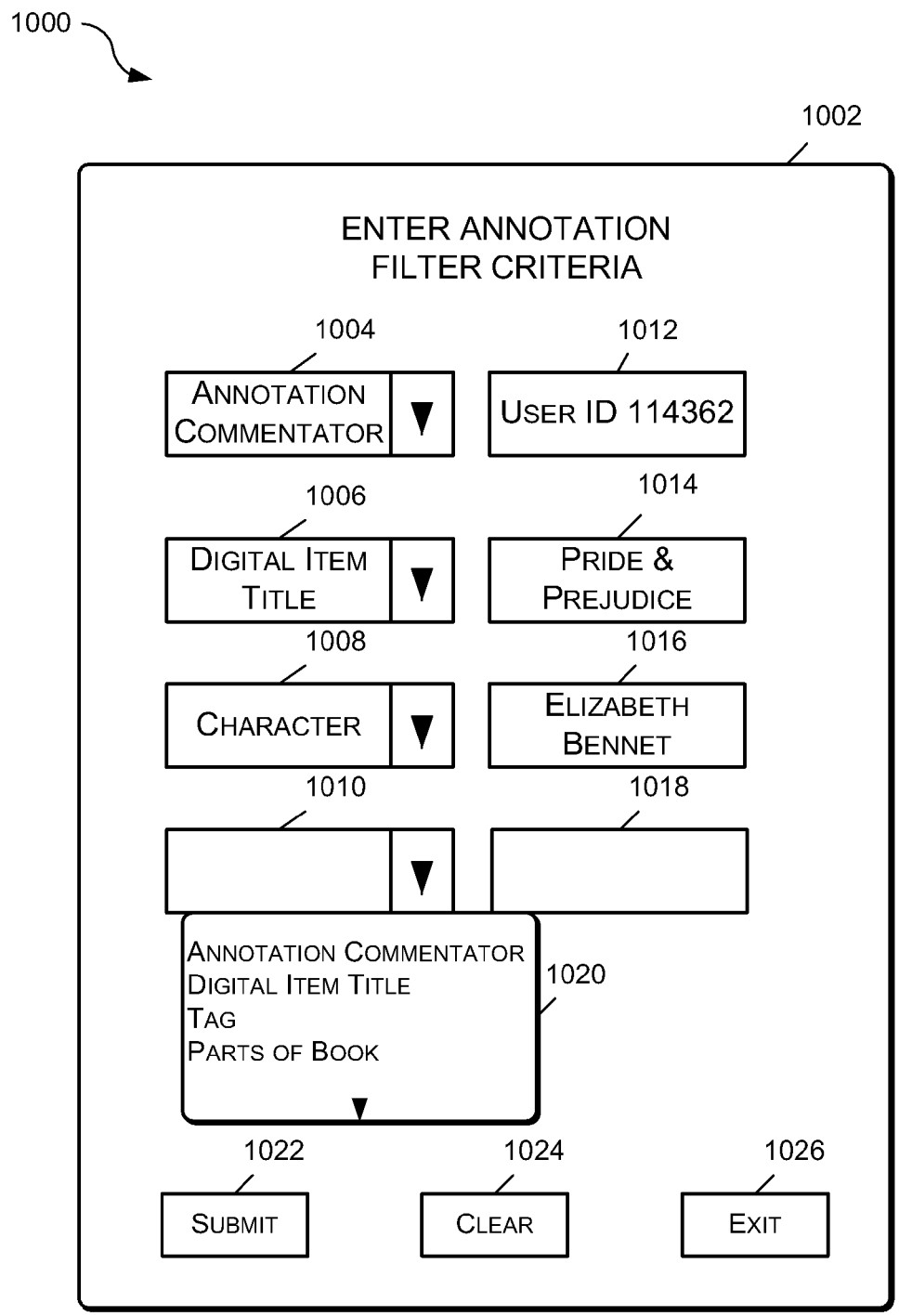
FIG. 10 is a pictorial diagram of an illustrative user interface configured to generate a request to filter annotations of digital items.

The filter request module 222 may also be configured to provide data to a client device to generate one or more user interfaces related to entering a filter request. For example, the filter request module 222 may send filtering user interface data to a client device via the Internet related to a web page to be presented at the client device. The web page may include one or more filtering fields to specify criteria for a filter request. An example of a filtering user interface to specify criteria for a filter request is illustrated in FIG. 10.

The filter results module 224 may be configured to search the annotations database 112 for annotations that match the criteria of a filter request. Additionally, the filter results module 224 may be configured to exclude certain annotations matching exclusions included in the filter request. In one example, all of the data related to each annotation in the annotations database 112 may be parsed to identify specified keywords or other criteria associated with particular annotations. The filter results module 224 may also search various portions of the data relating to each annotation of the annotations database 112 depending on the criteria of the filter request. For example, the annotations data may be partitioned, where each partition includes a different type of data associated with a particular annotation. To illustrate, an annotation may be partitioned to include a first portion that includes auto generated metadata indicating a time when the annotation was stored, geographic location of the commentator of the annotation, client device sending the annotation, or any combination thereof. Annotation data may also include a second portion that includes the annotation itself, such as textual content, audio content, video content, a manner of altering text of a digital item (e.g. highlighting), or a combination thereof. A third portion of the annotation data may include other information associated with the annotation, such as commentator of the annotation, an identifier indicating the digital item or items associated with the annotation, tags relating to the annotation, location within the digital item that the annotation pertains to, character or characters associated with the annotation, or a combination thereof. Although the annotation data has been described as being partitioned into three portions, the annotation data can be partitioned into any number of regions and using any known partitioning technique.

Further, the filter results module 224 may be configured to package data related to a filter request and send the filter results to requesting client devices. The filter results may be packaged in a format that allows software executed at a client device to unpackage the filter results data and present the filter results via a display of the client device. For example, the filter results module 224 may send the filter results data in a hyper-text markup language format, such that the filter results data can be presented via a web page. An example of a display of filter results data is illustrated in FIG. 11.

In a particular embodiment, the filter results module 224 may be configured to identify new annotations added to the annotations database 112 after receiving the filter request, where the new annotations match the criteria of the filter request. The filter results module 224 may be configured to send the new annotations to a client device based on a filter request received previously from the client device. In one embodiment, the filter results module 224 is configured to check for new annotations on a periodic basis or upon the occurrence of an event (e.g., restarting the client device, logging into a site, etc.) and automatically send new annotations matching criteria of one or more previously received filter requests to a particular client device. In another embodiment, the filter results module 224 is configured to check for new annotations matching specified criteria of filter requests in response to receiving a reminder filter request including the specified criteria from a respective client device.

The tagging module 226 is configured to tag annotations, commentators of annotations, digital items including annotations, or a combination thereof, based on requests received from client devices. In an illustrative embodiment, the tagging module 226 may receive a request to tag an annotation according to a particular category, such as "spoiler" or "educational notes". In response to receiving the request to tag the annotation, the tagging module 226 may be configured to associate the annotation with the tag by including the tag in the annotation data stored in the annotations database. The tag may be a user-specified tag, a tag selected from a list of predetermined tags provided by an online service, or a combination thereof.

Further, the tagging module 226 may be configured to provide an annotation tagging interface on client devices. In one example, the tagging module 226 may send data to the client devices to provide a web page that includes menus configured to tag annotations. An example of a user interface configured to tag annotations is illustrated in FIG. 8.

The advertising module 228 is configured to provide advertisements relating to annotations. In a particular embodiment, the advertising module 228 is configured to provide advertisements to a client device in response to receiving an indication from the client device that a digital item has been accessed at the client device. For example, the server system 102 may receive an indication from the client device relating to a particular digital item being accessed via the client device and invoke the advertising module 228 to send specified advertisements to the client device. The advertising module 228 may send advertisements to the client device based on content related to the digital item. For example, the advertising module 228 may send advertisements to the client device related to merchandise associated with a particular digital item or character of the digital item. To illustrate, the advertising module 228 may send advertisements to the client device regarding Harry Potter merchandise when receiving an indication that a client device has accessed a book in the Harry Potter series. Additionally, the advertising module 228 may send advertisements to the client device based on the context of the content of the digital item. In one example, the advertising module 228 may send advertisements to the client device regarding legal services in response to an indication that a discussion relating to obtaining legal services in a book by John Grisham is being viewed via the client device.

Further, the advertising module 228 may send advertisements to the client device based on annotations relating to a portion of the digital item being accessed via the client device. In one embodiment, the advertising module 228 may send advertisements to the client device based on filtering activity, such as the number of annotations associated with a portion of a digital item being accessed via the client device. To illustrate, the advertisement module 228 may receive an indication that a client device is accessing a portion of a book with a number of annotations above a specified threshold and provide advertisements to the client device related to that portion of the book. In another embodiment, the advertising module 228 may send advertisements to the client device based on the content of annotations. For example, the advertising module 228 may receive data indicating that a client device is accessing annotations associated with a particular book, where the annotations relate to differences between the book and a movie with the same title as the book, and the advertising module 228 may send advertisements to the client device related to a DVD version of the movie. An example of a user interface including annotations and corresponding advertisements is illustrated in FIG. 9.

Illustrative Client System

Figure 3:
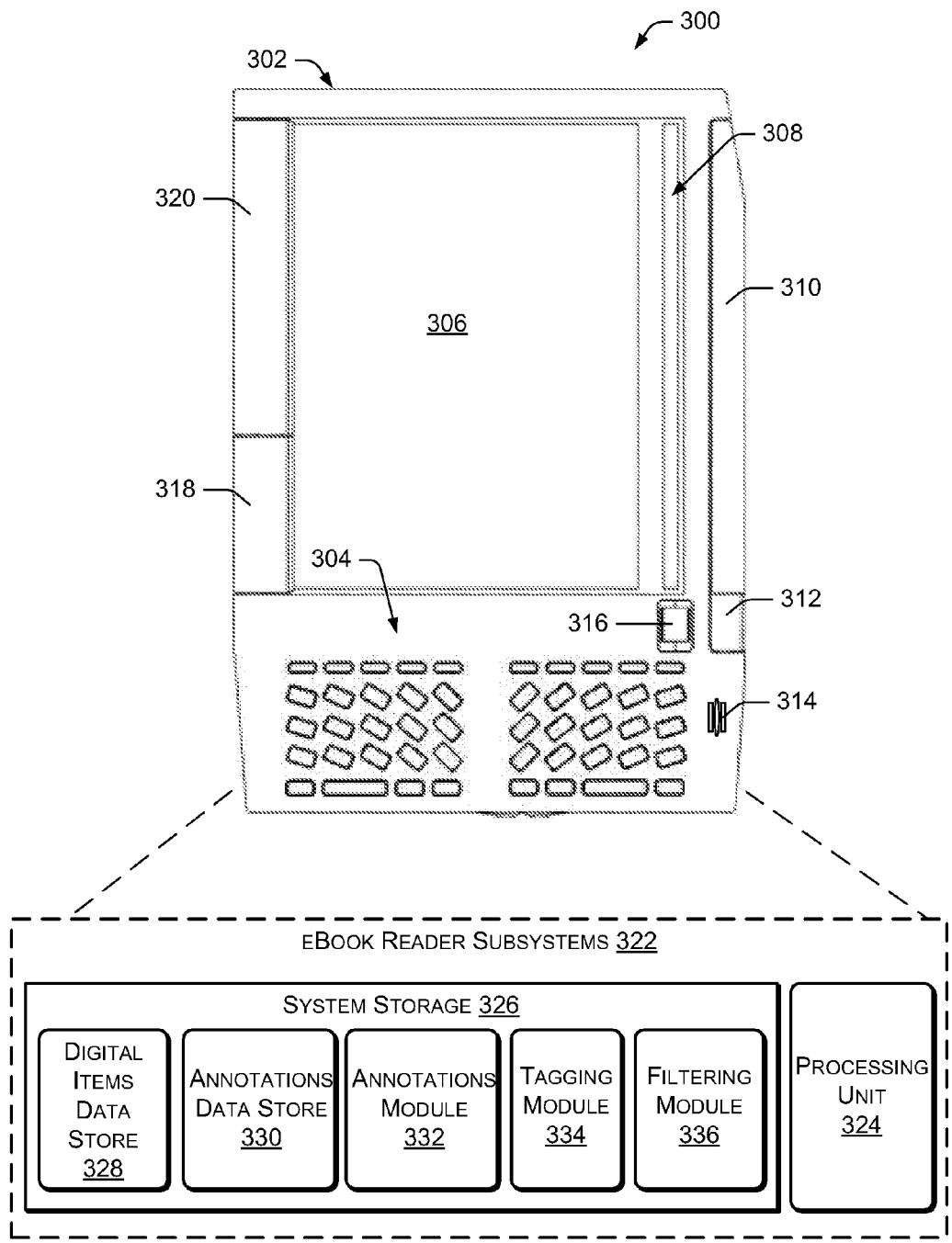
FIG. 3 is a pictorial diagram of an illustrative client system that may be used in the computing environment of FIG. 1.

FIG. 3 is a pictorial diagram of an illustrative client system in the form of an electronic reader device 300 that may be used with the computing environment of FIG. 1. However, virtually any other type of client device may be used to provide collaborative annotations.

The electronic reader device 300 includes a body or housing 302, a keyboard 304, and a dual display system comprised of a first display 306 and a second display 308. The keyboard 304 includes a plurality of alphabetic, numeric, and/or function keys for entry of user input.

The first display 306 in the dual display system presents content in a human-readable format to the user. The content presented in the first display 306 may be digital items, such as electronic books, newspapers, or other readable or viewable materials. For example, the first display 306 provides the text of the electronic books and also depicts any illustrations, tables, or graphic elements that might be contained in the electronic books.

The second display 308 of the dual display system is a narrow screen located adjacent to the first display 306. The second display 308 is illustrated as being positioned to the right of the content display 306, although it may be located elsewhere in the housing 302 in other implementations. The second display 308 may be responsive to user input registered via, for example, a finger, a stylus, or other similar pointing device. Additionally, the second display 308 may enable presentation of graphic elements that correspond to content displayed in the first display 306.

The electronic reader device 300 may also include a variety of user input devices 310-320 to navigate through and among eBooks and digital items. Examples of user input devices 310-320 include buttons, scroll wheels, thumb wheels, thumb sticks, sensors that detect and register movement of a user's thumb or finger, tactile sensors, or any other conventional user input mechanism.

The electronic reader device 300 also has various internal components, which are referred to generally as electronic reader subsystems 322. In one implementation, the electronic reader subsystem 322 includes system storage 326 and a processing unit 324. The processing unit 324 interacts with the system storage 326 to facilitate operation of the electronic reader device 300. The system storage 314 may include volatile memory (such as RAM), nonvolatile memory, removable memory, and/or non-removable memory, implemented in any method or technology for storage of information, such as computer-readable instructions, data structures, program modules, or other data. Also, the processing unit 324 may include onboard memory in addition to or instead of the system storage 326. Some examples of storage media that may be included in the system storage 326 and/or processing unit 324 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the electronic reader device 300. Any such computer storage media may be part of the electronic reader device 300.

The system storage 326 may include a digital items data store 328 and an annotations data store 330. The digital items data store 328 may include one or more digital items received from a server system, such as the server system 102 in FIG. 1 and FIG. 2. For example, the electronic reader device 300 may be configured to download electronic versions of books from a server system and store the data associated with the electronic versions of the books in the digital items data store 328. The annotations data store 330 may include one or more annotations related to the digital items stored in the digital items data store 328. The annotations data store 330 may also include annotations that are associated with digital items that are not stored in the digital items data store 328. In an illustrative embodiment, the annotations data store 330 may store annotations associated with one or more users of the electronic reader device 300.

The system storage 326 also includes a number of modules 332-336 related to providing collaborative annotations. The annotations module 332 may be configured to provide an annotations user interface to enter annotations related to a digital item being viewed via the electronic reader device 300. The annotations module 332 may also be configured to provide a user interface that gives a user of the electronic reader device 300 the option of sending the annotation to be stored at a remote data store, such as the annotations database 112 of FIG. 1 and FIG. 2, the option of storing an annotation locally at the annotations data store 330, or any combination thereof. Additionally, the annotations module 332 may provide an annotation to the first display 306 such that the annotation is arranged according to a predetermined note-taking format, such as the Cornell format or the Sorbonne format. The annotations module 332 may also allow users to select a note taking format in which the annotations are displayed.

The tagging module 334 may be configured to provide a tagging user interface to specify a tag with respect to a particular annotation associated with a portion of a digital item. Additionally, the tagging module 334 may be configured to tag a commentator of an annotation, a digital item associated with an annotation, or a combination thereof. The tagging module 334 may also be configured to provide a user of the electronic reader device 300 with the option to store a tag at a remote data store, such as the annotations database 112 of FIG. 1 and FIG. 2, to store a tag locally at the annotations data store 330, or any combination thereof. An example of a user interface configured to tag an annotation is illustrated in FIG. 8.

The filter module 336 may be configured to present one or more filtering user interfaces on the device 300, usable to filter annotations according to specified criteria. In an illustrative embodiment, the filter module 336 may receive data indicating criteria via the one or more filtering user interfaces and send a filter request to a server system to provide annotations matching the criteria of the filter request. The filter module 336 may receive the results associated with the filter request and provide the results via the display 306. In another illustrative embodiment, the filtering module 336 may be configured to filter annotations stored locally in the annotations data store 330.

In addition to the features shown in FIG. 2, the system storage 326 of the electronic reader device 300 may store an application for browsing web pages. Further, the electronic reader device 300 may include a network interface that enables communication with other computing devices such as the server system 102 of FIG. 1 and FIG. 2, with another client device, or a combination thereof. Wired or wireless network connections may be used with any suitable communication protocol, such as TCP/IP. For example, the network interface may be configured to send tag data to a server system and to send a filter request to a server system. In another example, a user of the electronic reader device 300 and a user of an additional client device may exchange emails, participate in a chat session, participate in a video or audio conference, or a combination thereof, via the network interface. The user of the electronic reader device 300 and the user of the additional client device may also be able to access and exchange communications regarding previously stored chat sessions. The communications between the user of the electronic reader device 300 and the user of the additional client device may be related to digital items accessed via the electronic reader device 300 and the additional client device, and in a particular illustration, the communications may be related to annotations associated with the digital items. In some implementations, the user of the electronic reader device 300 and the user of the additional client device may be members of a group, such as a book club, an educational class, or a social networking group.

Illustrative Annotation Methods

Figure 4:
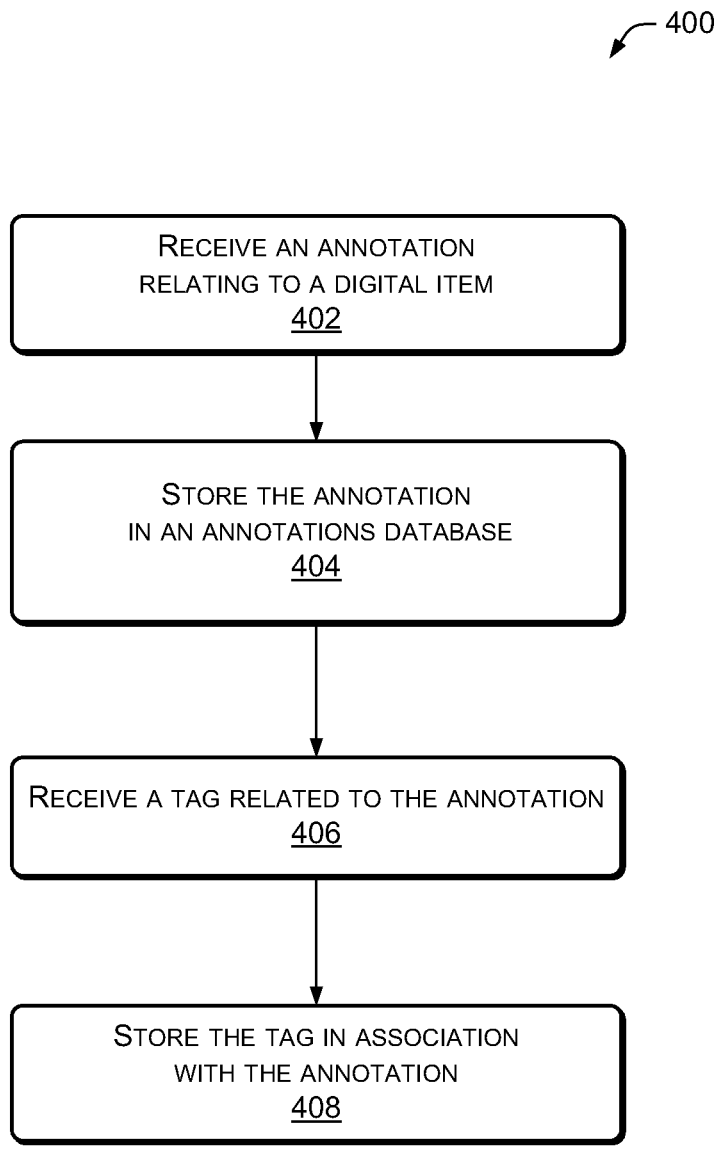
FIG. 4 is a flow diagram of an illustrative method of tagging an annotation of a digital item.

FIG. 4 is a flow diagram of an illustrative method 400 of tagging an annotation of a digital item. The method 400 may, but need not necessarily, be implemented using the server system 102 and/or one or more of the client devices 104 and 106 shown in FIGS. 1, 2, and 3. In this particular implementation, the method 400 begins at block 402 with receipt of an annotation relating to a digital item. In one example, the annotation may be relating to a specified portion of the digital item, such as a portion of text on a page of an eBook or a chapter of an eBook. In another example, the annotation may be relating to the entire contents of the digital item. The annotation may be generated by a particular client device with respect to a particular digital item being accessed via the client device. For example, a user of the client device may enter text via a user interface that is related to a portion of the digital item that is shown on a display of the client device. In another example, a user of the client device may highlight text or illustrations associated with a digital item via a user interface. The client device generating the annotation may send annotation data to another client device, to a server system, such as the server system 102 of FIG. 1 and FIG. 2, to a local memory device, or any combination thereof. The annotation data may include the annotation and additional data related to the annotation, such as the commentator writing the annotation, a time when the annotation was entered, an identifier of the client device that generated the annotation, or a combination thereof.

Moving to 404, the annotation is stored in an annotations database. The annotations database may include a remote annotations database, such as the annotations database 110 of FIG. 1 and FIG. 2, a local database, such as the annotations data store 330 of FIG. 3, or any combination thereof. Storing an annotation in association with a digital item may be accomplished in any suitable manner, including simply storing the annotation in the annotations database 120 with an indication of the digital item to which the annotation pertains, and if apt, the particular content within the digital item to which the annotation pertains. Further, the annotation may be stored such that the annotation is accessible to all users requesting to view the annotation or such that access to the annotation is restricted. The accessibility of the annotation may be specified by the commentator generating the annotation. In one example, a particular commentator may specify that annotations entered by the particular commentator may only be accessed by members of a certain social networking group, by members of a specified educational class, by one or more particular people specified by the commentator of the annotation, by subscribers of a service that provides annotations by certain commentators, such as the author of a digital item, by users paying a fee, or a combination thereof. In another example, a particular commentator may specify that annotations entered by the particular commentator are private and only accessible to the particular commentator and not to others. Additionally, a creator of a digital item, such as an author of a book or article, may have access to annotations that are associated with the digital item and have the opportunity to comment on the annotations. In some implementations, the creator of the digital item has unrestricted access to the annotations associated with the digital item.

Moving to 406, a tag is received related to the annotation. As explained previously, the tag may associate the annotation with a particular category or classification. The tag may be generated via a user interface provided by a client device, such as the electronic reader device 300 of FIG. 3. Proceeding to 408, the tag is stored in association with the annotation. The tag may be stored in a remote data store, such as the annotations database 112 of FIG. 1 and FIG. 2, in a local annotations database, such as the annotations data store 330 of FIG. 3, or a combination thereof. In an illustrative embodiment, the tag may be stored in association with the annotation by storing the tag in the annotation data relating to the annotation.

Figure 5:
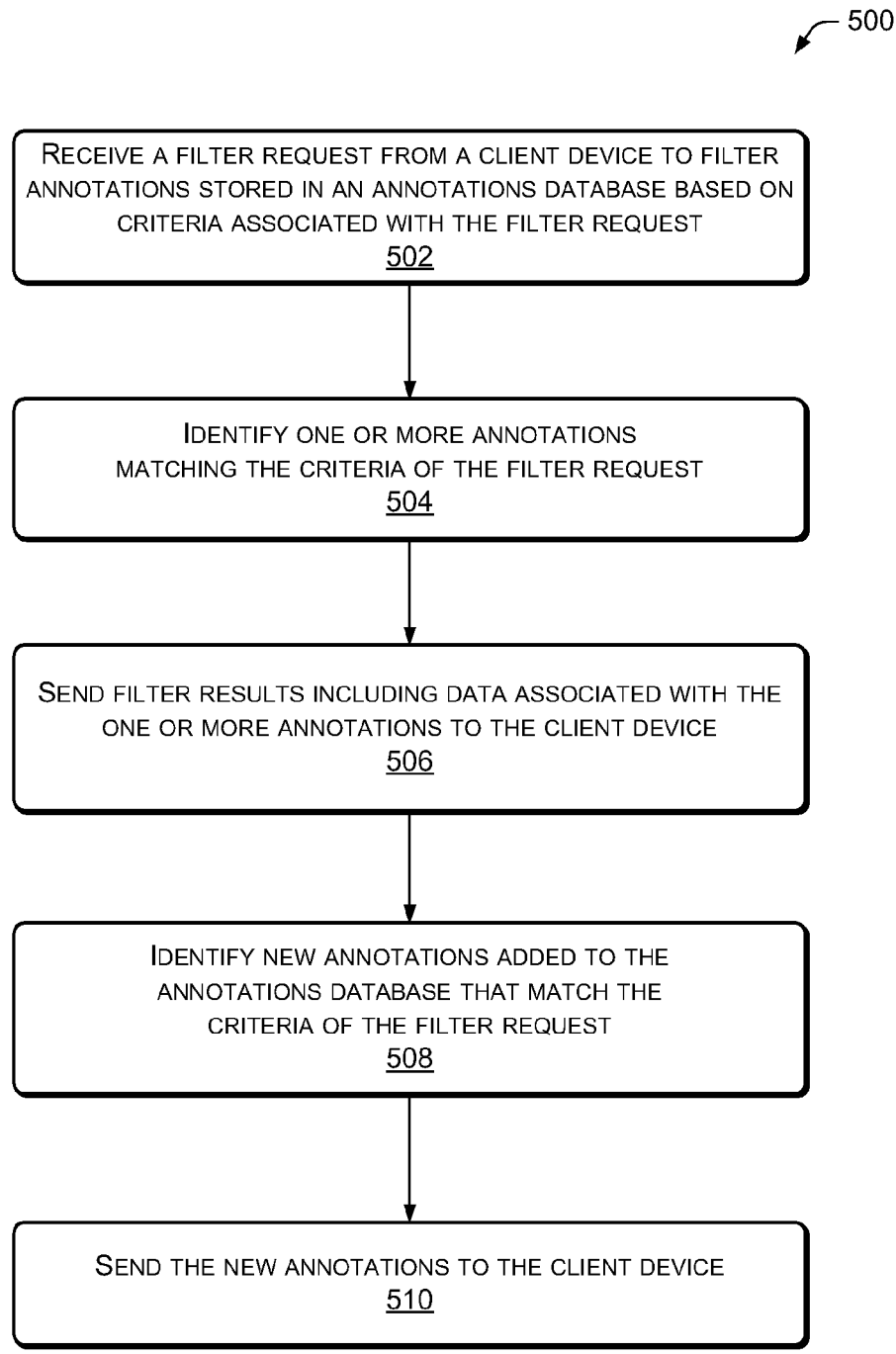
FIG. 5 is a flow diagram of an illustrative method of processing a filter request related to annotations of one or more digital items and providing filter results relating to the filter request.

FIG. 5 is a flow diagram of an illustrative method 500 of processing a filter request related to annotations of one or more digital items and providing results of the filter request. At 502, the method 500 begins by receiving a filter request from a client device to filter annotations stored in an annotations database based on criteria associated with the filter request. The criteria of the filter request may be used to narrow a search of a large database of annotations to provide annotations of interest to a user of a particular client device. The criteria of the filter request may also include one or more exclusions to further narrow the annotations that may be of interest to the user. Moving to 504, one or more annotations are identified that match the criteria of the filter request. In an illustrative embodiment, a server system may parse a searchable database of annotations, such as the annotations database 112 of FIG. 1 and FIG. 2, for annotations that match the criteria of the filter request. For example, the server system may parse the database for annotations entered by a particular commentator, entered within a particular time period, relating to a particular digital item, such as an eBook, relating to specified portions of a digital item, such as a specific paragraph or sentence, relating to particular characters, including certain keywords, relating to a particular tag, or a combination thereof. In an illustrative, non-limiting embodiment, the matching annotations may be associated with a plurality of different digital items.

Proceeding to 506, data associated with the annotations matching the filter criteria is sent to the client device that sent the filter request. The data may include the annotations themselves, such as textual content, metadata associated with the annotations, text of the digital item or digital items associated with the annotations, a series of links related to the annotations, or any combination thereof. At 508, new annotations added to the annotations database after receiving the filter request that match the criteria of the filter request are identified. Proceeding to 510, the new annotations are sent to the client device. In an illustrative embodiment, a user of a client device may specify an option to receive updates on additional annotations that match the specified criteria of a particular filter request. A server system may monitor for annotations added to the annotations database that match the criteria of the filter request and continuously send the newly added annotations to the client device. The user of the client device may specify an updating option in the filter request, in a profile associated with the user, or a combination thereof.

Figure 6:
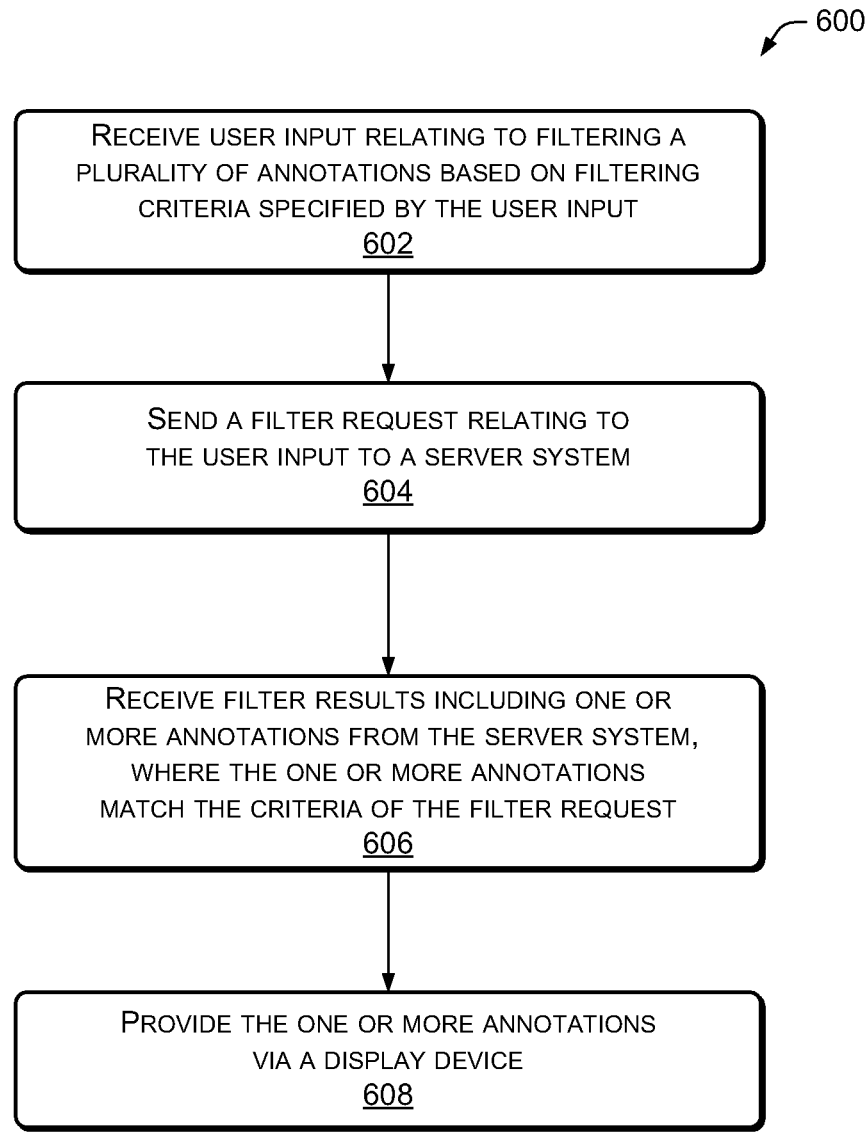
FIG. 6 is a flow diagram of an illustrative method of sending a filter request related to annotations of a digital item to a server system and receiving the results of the filter request from the server system.

FIG. 6 is a flow diagram of an illustrative method 600 of sending a filter request related to annotations of a digital item to a server system, such as the server system 102 of FIG. 1 and FIG. 2, and receiving the results of the filter request from the server system. The method 600 begins at 602 where user input is received relating to filtering a plurality of annotations based on criteria specified by the user input. In an illustrative embodiment, the user input is received via one or more input devices of a client device, such as the input devices 310-320 of the electronic reader device 300 illustrated in FIG. 3. Moving to 604, a filter request relating to the user input is sent to a server system. The filter request includes the criteria specified by the user input.

Proceeding to 606, filter results including one or more annotations are received from the server system. The one or more annotations match the criteria specified by the filter request. At 608, the one or more annotations matching the criteria are provided via a display of a client device.

Figure 7:
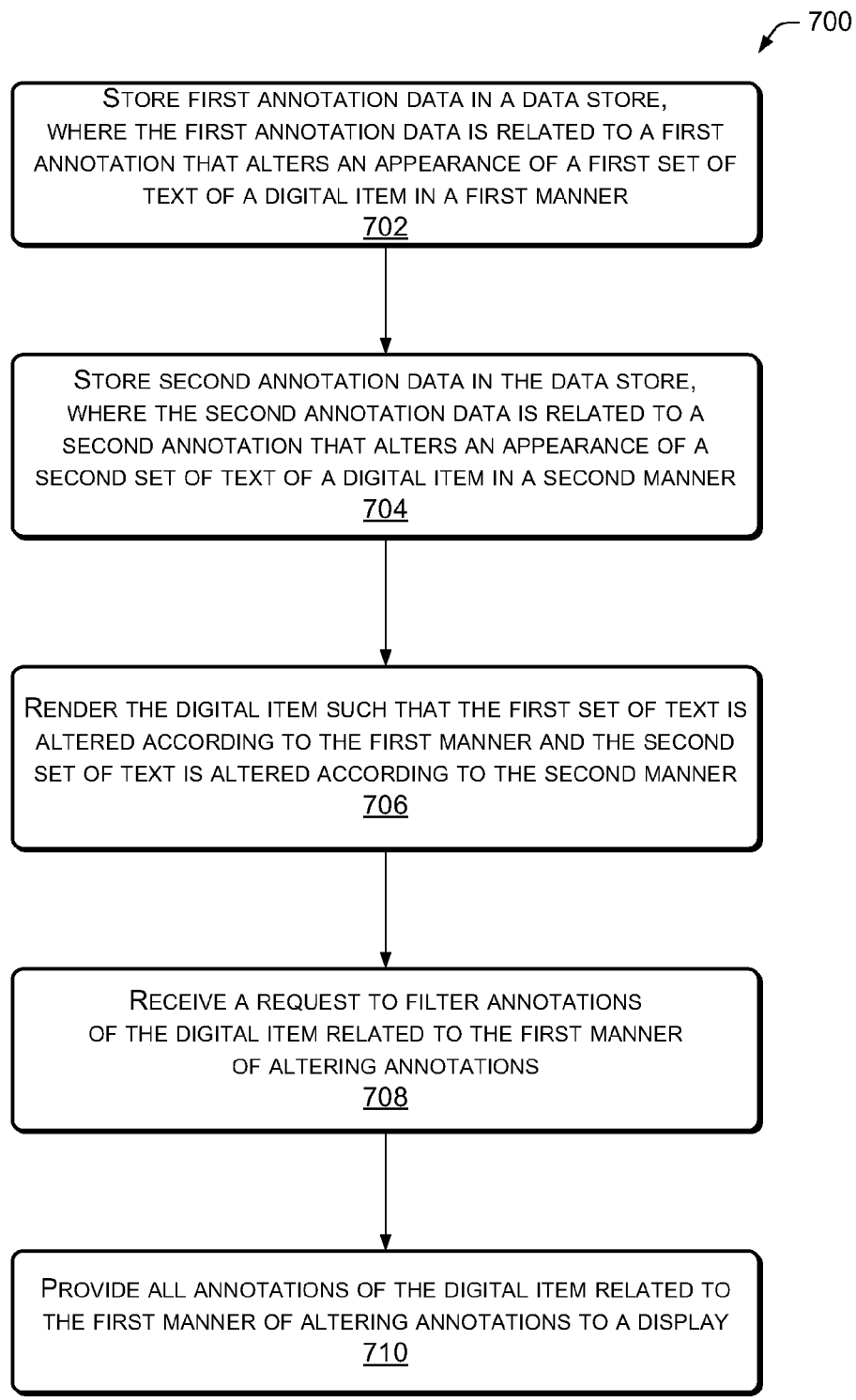
FIG. 7 is a flow diagram of an illustrative method of filtering digital item annotations based on the manner in which the annotations alter the appearance of text of the digital item.

FIG. 7 is a flow diagram of an illustrative method 700 of filtering digital item annotations based on the manner in which the annotations alter the appearance of text of the digital item. The method 700 begins at 702 with storing first annotation data in a data store. The first annotation data is related to a first annotation that alters an appearance of a first portion of text of a digital item in a first manner. For example, the first annotation may include highlighting of certain text of a digital item with yellow highlighting. In another example, the first annotation may include changing the appearance of text of a digital item by altering the font of a portion of the text of the digital item, by italicizing the text, by bolding the text, by capitalizing the text, or a combination thereof.

Moving to 704, second annotation data is stored in a data store. The second annotation data is related to a second annotation that alters an appearance of a second portion of a digital item in a second manner. For example, the second annotation may include highlighting of certain text of a digital item with green highlighting. Proceeding to 706, the digital item is rendered such that the first portion of text is altered according to the first manner and the second portion of text is altered according to the second manner. In an illustrative embodiment, a user of an electronic reader device, such as the electronic reader device 300 of FIG. 3, may highlight portions of a digital item, such as a textbook or other educational material, to indicate different aspects of the digital item. In one example, a user of the electronic reader device may highlight portions of a textbook related to mathematical equations in yellow highlighting and highlight portions of the textbook related to keywords in green highlighting.

At 708, a request is received to filter annotations of the digital item related to the first manner of altering annotations. Moving to 710, all annotations of the digital item related to the first manner of altering annotations are provided to a display device. Continuing with the example above, a user of an electronic reader device may generate a request to view all of the text of a digital item that has been highlighted in yellow. Subsequently, the electronic reader device may identify annotations indicating portions of the digital item that have been highlighted in yellow and present the corresponding mathematical equations via a display of the electronic reader device.

Illustrative User Interfaces

FIGS. 8-11 illustrate pictorial diagrams of illustrative user interfaces 800-1100 that are related to tagging and filtering annotations. Each of the user interfaces 800-1100 may be provided via a display of a client device, such as the client devices 104 and 106 of FIG. 1 and the electronic reader device 300 of FIG. 3. The user interfaces 800-1100 may be generated based on instructions stored at the client device. In one embodiment, the instructions may be associated with proprietary software provided by the manufacturer of the client device or by an entity providing a digital item annotations service. In another embodiment, the instructions may be associated with a publicly available viewer, such as the Adobe® Reader®, provided by Adobe Systems, Inc. of San Jose, Calif., Windows Media® Player, provided by Microsoft Corporation of Redmond, Wash., iTunes®, provided by Apple, Inc of Cupertino, Calif. Additionally, each of the user interfaces 800-1100 may be generated as a web page accessible via the Internet.

FIG. 8 is a pictorial diagram of an illustrative tagging user interface 800 configured to tag annotations of a digital item. The user interface 800 includes a first display portion 802 comprising content related to a digital item. In particular, the first display portion 802 includes text from a portion of William Shakespeare's Romeo and Juliet. The user interface 800 also includes a second display portion 804 having a number of annotations related to the displayed text of the digital item. Although the annotations in the second display portion 804 are shown as excerpts of the annotation text, the annotations can be identified using other techniques. For example, annotations related to a particular portion of a digital item may be identified within the second display portion 804 based on the commentator that posted the annotation, the time the annotation was entered, in another manner, or any combination thereof. Additionally, annotations may be shown in order within the second display portion 804 from top to bottom based on a ranking associated with a commentator submitting a respective annotation, based on a ranking of the annotation, or a combination thereof. In this way, higher quality annotations or annotations submitted by more respected commentators will be displayed first. In an illustrative, non-limiting embodiment, annotations provided by a creator of a digital item may receive priority over other annotations and be displayed first.

The user interface 800 is configured to allow a user of a client device to select a particular annotation, such as the annotation 806, via user input. The user input may include strokes of a keyboard, operation of a pointing device, such as a mouse, operation of a stylus, or a combination thereof. After selecting a particular annotation, the user interface 800 may be configured to present a window related to tagging the annotation, such as the first window 808. In one example, the first window 808 may automatically appear in response to the selection of the annotation 806. In another example, the first window 808 may appear in response to a user input, such as a right click of a mouse.

In response to selecting a tag option of the first window 808, a second window 810 appears that allows a user of the client device to specify a tag to associate with the annotation 806. The second window 810 includes a tagging field 812 to provide a user specified tag. The second window 810 also includes a hyperlink 814 configured to provide a list of predetermined tags. The list of predetermined tags may include tags specified by a provider of an annotation tagging service, such as an online service, tags previously specified by the user of the client device, tags specified by other users of the annotation tagging service, or any combination thereof. In an illustrative, non-limiting embodiment, the list of tags may appear in a separate window or display (not shown). In response to specifying a tag via the tagging field 812 or choosing a tag from a list of tags, tagging data may be sent to a server system, such as the server system 102 of FIG. 1 and FIG. 2 and/or to the client device to associate the annotation 806 with the specified tag.

FIG. 9 is a pictorial diagram of an illustrative user interface 900 configured to display annotations related to a digital item and to display related advertisements. The user interface 900 includes a first display portion 902 and a second display portion 904. The first display portion 902 includes text from a portion of William Shakespeare's Romeo and Juliet and the second display portion 904 includes a number of annotations relating to the displayed text of the digital item. The user interface 900 also includes a third display portion 906. The third display portion 906 includes an advertisement relating to the digital item shown in the first display portion 902. In another embodiment, the third display portion 906 may include an advertisement related to the annotations shown in the second display portion 904. In one example, the advertisement shown in the third display portion 906 may be related to the content of the annotations. In another example, the advertisement may be related to a number of annotations associated with the portion of the digital item shown in the first display portion 902. To illustrate, when the number of annotations associated with a certain portion of a digital item exceeds a threshold, a first advertisement may be shown in an attempt to maximize exposure to the advertisement. When the number of annotations is below the threshold, a second advertisement may be shown. In an illustrative, non-limiting embodiment, the first advertisement may be associated with a first advertiser that has provided more compensation to a digital item service provider, such as an online service, for an advertising spot than a second advertiser that has provided less compensation for the advertising spot.

FIG. 10 is a pictorial diagram of an illustrative filtering user interface 1000 configured to generate a request to filter annotations of digital items. The user interface 1000 is configured to utilize a display portion 1002 to present a number of filtering fields to specify criteria to filter annotations. The display portion 1002 includes four filtering fields 1004-1010 to select filtering categories and four corresponding filtering fields 1012-1018 to select respective filter terms associated with the categories. The filtering categories and filter terms comprise the criteria of the filter request. Although filtering categories and filter terms comprise the criteria of a filter request in FIG. 10, other implementations may utilize different criteria. In some embodiments, the filtering fields may be configured to enter exclusions, as well as, keywords and other criteria. In this way, a filter request can be entered via the user interface 1000 to provide annotations including some keywords or matching particular criteria, but excluding annotations within that group including other keywords or that are associated with other criteria.

In the embodiment of FIG. 10, the filtering field 1004 indicates selection of a filtering category "annotation commentator" and the filtering field 1012 includes a user identification number associated with a selected annotation commentator. The user identification number may be provided by an online service to customers that utilize the online service, to users that sign up to utilize an annotations service provided by the online marketplace, to users associated with particular client devices, such as the electronic reader device 300 of FIG. 3, or any combination thereof. Although, a user identification number is shown to identify an annotation commentator, other identifiers may be used to distinguish between annotation commentators, such as a user name, an email address associated with the annotation commentator, another identifier associated with the commentator, or any combination thereof.

The filtering field 1006 indicates selection of a second filtering category "digital item title" and the corresponding filtering field 1014 includes the filter terms "Pride & Prejudice." Additionally, the filtering field 1008 indicates selection of a filtering category "character" and the corresponding filtering field 1016 includes the filter terms "Elizabeth Bennet." The filtering field 1010 remains blank and the display portion 1002 includes a drop down menu 1020 associated with the filtering field 1010 indicating that a user is in the process of selecting another filtering category. The corresponding filtering field 1018 is also blank awaiting entry of one or more filter terms relating to the filtering category selected in the filtering field 1010. Although four pairs of filtering category filtering fields and corresponding filter term filtering fields are shown in FIG. 10, any number of filtering fields may be used and additional filtering fields may be added upon request from a user.

The display portion 1002 also includes a number of selectable display icons 1022-1026. The first display icon 1022 is configured to submit a filter request. The filter request may indicate the filtering categories and filter terms entered into one or more of the filtering fields 1004-1018. Upon selection of the second display icon 1024 a particular filtering field may be cleared. Selection of the second display icon 1024 may also trigger display of a selectable option to clear all of the filtering fields. The third display icon 1026 is configured to exit the user interface 1000 without submitting a filter request.

In an illustrative embodiment, a user may select filtering categories for each of the fields 1004-1010 from a drop down menu, such as the drop down menu 1020. In one embodiment, a respective drop down menu provided for each filtering field 1004-1010 may include the same listing of filtering categories. In another embodiment, the respective drop down menu provided for a particular filtering field may depend on previous category selections. Additionally, the respective drop down menu provided for a particular filtering field may be unique to that filtering field. After selecting a filtering category from one of the filtering fields 1004-1010, a user may provide filter terms associated with the respective filtering category. The filter terms for a particular filtering field may be selected from a respective drop-down menu of predetermined filter terms and/or the filter terms for the particular filtering field may be user specified. For example, selection of the filtering category "annotation commentator" with respect to the filtering field 1004 may cause a prompt to appear in the filtering field 1012 to allow a user to enter an identification associated with the annotation commentator. In an illustrative, non-limiting embodiment, multiple filter terms or filtering categories may be entered into a respective field, such as multiple annotation commentators. In another example, selection of the filtering category "digital item title" with respect to the filtering field 1006 may initiate a prompt to appear in the filtering field 1014 to enter a title of a digital item or a drop down menu may appear with a number of predetermined digital item titles. To illustrate, a drop down menu may appear after selection of the filtering category "digital item title" that includes titles of all of the digital items stored in a data store of an electronic reader device associated with the user. Further, the drop down menus associated with the filtering fields 1004-1018 may be related to inputs entered in previous filtering fields. For example, upon entering "Pride & Prejudice" into the filtering field 1014 and selection of the filtering category "character" with respect to the filtering field 1008, a drop down menu may be presented that includes one or more of the characters in Pride & Prejudice. After a user has completed entering the criteria for a filter request, the user may select the first display icon 1022 to generate the filter request including the criteria specified in the filtering fields 1004-1018.

FIG. 11 is a pictorial diagram of an illustrative user interface 1100 to provide results related to a filter request. The user interface 1100 includes a display portion 1102 that includes results from a search of an annotations database after receiving a filter request from a client device. The display portion 1102 includes a first section 1104 including the criteria associated with a particular filter request. The display portion 1102 also includes a second section 1106 having the annotations that meet the criteria of the filter request. The annotations of the second section 1106 may be presented as a list of selectable links, where each link includes an excerpt of the annotation text. Upon selection of a particular link, a separate user interface may appear (not shown) that includes the entire content of the annotation associated with the selected link. Other information may also be included with the annotation, such as the time that the annotation was entered, the geographic location of the annotation commentator, contact information associated with the annotation commentator, other information relating to the annotation commentator, or any combination thereof.

While several implementations have been illustrated and described above, it will be appreciated that various changes can be made therein and that the scope of the implementations should be determined from the following claims and equivalents thereto.

Certain drawings illustrate features by showing various logic, modules, components, functionality, and so forth. The terms "logic," "module," "component," "functionality" and the like generally represent hardware, software, firmware, or any combination of these elements, or yet some other kind of implementation. The term "computer-readable media" refers to any kind of media capable of retaining information in any form readable by a computer or other machine, including various kinds of storage devices (magnetic, optical, static, etc.). Various instructions, methods and techniques described herein may be considered in the general context of computer-readable storage media including computer-executable instructions, such as program modules, executed by one or more computers or other devices. The computer-executable instructions include routines, programs, objects, components, data structures, etc. for performing particular tasks or implementing particular abstract data types. The computer-executable instructions may be executed as native code or may be downloaded and executed, such as in a virtual machine or other just-in-time compilation execution environment. Typically, the functionality of the computer-executable instructions may be combined or distributed as desired in various implementations.

Other figures illustrate features in signal diagram form and/or flowchart form. In this mode of explanation, certain operations are described as constituting distinct tasks performed in a certain order. Such implementations are illustrative and non-limiting. Separate operations described in these figures may be grouped together and performed in a single operation, while certain single operations may be performed in multiple parts. Certain operations may be performed in an order different from the order illustrated in the figures. Certain operations may be performed by different agents than is identified in the figures. The operations shown in the figures may be implemented by software, firmware, hardware, manual processing, or other form, or by any combination of these forms.

In general, the various features described in the implementations may be regarded as optional features, meaning that these features may be omitted or replaced with other features. Further, the various implementations described herein may be supplemented by adding additional features.

What is claimed is:

1. An electronic reader device comprising:
    a display to display an electronic book;
    a processing unit;
    a system storage accessible to the processing unit, the system storage storing computer-readable instructions that when executed by the processing unit perform operations comprising:
        providing a first annotation of the electronic book to an online service, the first annotation altering a first portion of text of the electronic book in a first manner;
        providing a second annotation of the text of the electronic book to the online service, the second annotation altering a second portion of the text of the electronic book in a second manner different from the first manner;
        providing a tagging user interface via the display, wherein the tagging user interface includes at least one tagging field to specify a tag to categorize a third annotation of the electronic book;
        presenting a filtering user interface via the display, wherein the filtering user interface includes at least one filtering field to specify one or more manners in which one or more portions of the text of the electronic book is altered; and
        generating a filter request based at least in part on the specified one or more manners in which the one or more portions of the text of electronic book is altered; and
    a network interface to send the filter request to the online service.

2. The electronic reader device of claim 1, wherein the network interface sends tag data to a server system, the tag data including the tag to categorize the third annotation of the electronic book.

3. The electronic reader device of claim 1, further comprising:
    a digital items data store, including the electronic book; and
    an annotations data store including one or more annotations relating to the electronic book.

4. The electronic reader device of claim 3, wherein the annotations data store includes one or more annotations related to electronic books not included in the digital items data store.

5. The electronic reader device of claim 1, wherein the computer-readable instructions that when executed by the processing unit perform operations further comprising providing an annotations user interface usable to enter one or more annotations of the electronic book.

6. The electronic reader device of claim 5, wherein the one or more annotations include text, text formatting, image content, highlighting of text, or any combination thereof.

7. The electronic reader device of claim 5, wherein the operations further comprise providing the one or more annotations of the electronic book to the display such that the one or more annotations are arranged according to a predetermined note-taking format.

8. A method comprising:
receiving an annotation relating to textual content of an electronic book from a first client device;
storing annotation data in an annotations database, the annotation data including the received annotation;
receiving a tag that categorizes the received annotation;
storing the tag in association with the received annotation;
receiving a first request from a second client device, the first request being to download the electronic book to the second client device;
receiving a second request from the second client device, the second request being to identify annotations of the electronic book that are associated with a specified tag;
identifying one or more annotations of the electronic book that are associated with the specified tag, the one or more annotations including the received annotation;
sending the one or more annotations to the second client device in conjunction with sending the electronic book to the second client device at least partly in response to the first request and the second request;
identifying a quantity of annotations associated with a portion of the electronic book and sending:
a first advertisement when the quantity of annotations associated with the portion of the electronic book exceeds a threshold, or
a second advertisement when the quantity of annotations associated with the portion of the electronic book is below the threshold.

9. The method of claim 8, wherein the tag is user defined, selected from a plurality of pre-defined tags, or a combination thereof.

10. The method of claim 8, wherein storing the tag in association with the received annotation includes storing the tag in the annotation data.

11. The method of claim 8, wherein the annotations database includes respective annotation data relating to each of a plurality of electronic books, and wherein at least a portion of the respective annotation data relating to each electronic book of the plurality of electronic books includes at least one identifier indicating an electronic book corresponding to the respective annotation data.

12. The method of claim 8, wherein the annotation data is stored such that the received annotation is accessible to all users requesting to view the received annotation.

13. The method of claim 8, wherein the received annotation is stored such that access to the received annotation is restricted.

14. The method of claim 13, wherein the access to the received annotation is restricted by a commentator of the received annotation.

15. The method of claim 13, wherein the access to the received annotation is restricted to members of a social networking group, members of an educational class, subscribers of a service providing annotations, one or more particular people specified by a commentator of the received annotation, the commentator of the received annotation, or a combination thereof.

16. The method of claim 8, wherein annotations associated with the electronic book are accessible to a creator of the electronic book.

17. A method comprising:
retrieving, by an online service, information from one or more sources about a particular digital item;
providing, by the online service, the information to an annotations database as one or more annotations of the particular digital item;
receiving, by the online service, a filter request from a client device to identify annotations, the filter request requesting to exclude a spoiler annotation, wherein the spoiler annotation comprises an annotation that is tagged as discussing content of a digital item that is subsequent to a location of the annotation in the digital item, the filter request further specifying that filter results are to be sent to a plurality of devices;
identifying, by the online service, an additional annotation that satisfies the filter request by searching an annotations database; and
in response to the filter request, sending by the online service, data related to the additional annotation to one or more devices of the plurality of devices, the one or more devices being different from the client device.

18. The method of claim 17, further comprising
identifying a quantity of annotations associated with a portion of the digital item and sending to the one or more devices:
a first advertisement when the quantity of annotations associated with the portion of the digital item exceeds a threshold, or
a second advertisement when the quantity of annotations associated with the portion of the digital item is below the threshold.

19. A method comprising:
receiving user input via one or more user input devices at a client device, the user input including a request to filter a plurality of annotations based on criteria specified by the user input, the criteria including an exclusion of a spoiler annotation, wherein the spoiler annotation comprises an annotation that is tagged as discussing content of a digital item that is subsequent to a location of the annotation in the digital item, the request to filter further specifying that filter results are to be sent to a plurality of client devices;
sending, at the client device, the request to a server system; and
after sending the request to the server system, receiving one or more annotations of the plurality of annotations that satisfy the criteria, wherein the plurality of annotations is associated with the digital item.

20. The method of claim 19, wherein the server system is coupled to an annotations database, the annotations database including the plurality of annotations associated with the digital item.

21. The method of claim 19, wherein the criteria include one or more keywords, a particular group of people, one or more ratings associated with each respective annotation of the plurality of annotations, a title of the digital item, data associated with one or more commentators, a tag associated with certain annotations, a location within a particular digital item, metadata associated with a particular annotation, an identifier of a particular commentator, or a combination thereof.

22. The method of claim 19, wherein the criteria include a particular group of people, the particular group of people including a book group, an educational class, a social networking group, or a combination thereof.

23. The method of claim 19, wherein the criteria include a credibility ranking associated with one or more commentators, a language of an annotation of the plurality of annotations, a language of the digital item, a data format of the annotation, or a combination thereof.

24. The method of claim 19, wherein the criteria include a location within the digital item, the location including an introduction, a climax, an anticlimax, a conclusion, a chapter, a section, a page, an epilogue, a table of contents, a forward, an abstract, a paragraph, a sentence, a specified portion of text, or a combination thereof.

25. The method of claim 19, wherein the criteria include metadata associated with a particular annotation, the metadata including a time at which the particular annotation was entered, an identifier indicating a client device sending the particular annotation, an identifier of a particular commentator, or a combination thereof.

26. The method of claim 19, wherein the plurality of annotations associated with the one or more digital items are stored in the client device, the method further comprising
    filtering the plurality of annotations stored in the client device based on the criteria specified by the user input to obtain the filter results; and
    providing the filter results via a display of the client device.

27. The method of claim 19, further comprising:
    providing the one or more annotations of the plurality of annotations that satisfy the criteria via a display of the client device.

28. A system comprising:
    a processor;
    a digital items database to store a plurality of digital items;
    an annotations database to store annotations relating to the plurality of digital items;
    memory accessible to the processor, the memory comprising computer-readable instructions that when executed by the processor perform operations comprising:
        receiving a filter request from a client device to filter the annotations stored in the annotations database based on criteria included in the filter request, the criteria including at least one of an age of a commentator, a number of annotations created by a commentator, a language of an annotation, a language of a digital item, a manner in which digital content is altered, or a data format of an annotation;
        identifying one or more annotations matching the criteria of the filter request and sending data associated with the one or more annotations to the client device;
        identifying one or more new annotations added to the annotations database after receiving the filter request and sending the one or more new annotations to the client device, the one or more new annotations matching the criteria; and
        identifying a quantity of annotations associated with a portion of a digital item of the plurality of digital items to be displayed and sending:
            a first advertisement when the quantity of annotations associated with the portion of the digital item of the plurality of digital items to be displayed exceeds a threshold, or
            a second advertisement when the quantity of annotations associated with the portion of the digital item of the plurality of digital items to be displayed is below the threshold.

29. The system of claim 28, the operations further comprising checking for the one or more new annotations on a periodic basis and to automatically sending the one or more new annotations to the client device.

30. The system of claim 28, the operations further comprising checking for the one or more new annotations in response to receiving a reminder filter request including the criteria of the filter request from the client device.

31. The system of claim 28, the operations further comprising sending the first advertisement or the second advertisement to the client device based on the one or more annotations matching the criteria of the filter request.

32. The system of claim 31, the operations further comprising determining the first advertisement or the second advertisement to send to the client device based on content of at least one respective digital item associated with the one or more annotations, based on filtering activity related to the one or more annotations, based on content of the one or more annotations, or any combination thereof.

33. The system of claim 28, wherein the annotations database stores annotations from a plurality of commentators, a plurality of client devices, or a combination thereof.

34. The system of claim 28, the operations further comprising receiving tags relating to corresponding annotations stored in the annotations database and storing the tags in association with the corresponding annotations in the annotations database.

35. One or more non-transitory computer-readable storage media including computer executable instructions that, when executed by a computer, perform acts comprising:
    storing first annotation data in a data store, wherein the first annotation data is related to a first annotation of a digital item, and wherein the first annotation is associated with a first type of text altering that includes highlighting, underling, bolding, italicizing, or capitalizing a first portion of text of the digital item;
    storing second annotation data in the data store, wherein the second annotation data is related to a second annotation of the digital item, and wherein the second annotation is associated with a second type of text altering that includes highlighting, underlining, bolding, italicizing, or capitalizing a second portion of text of the digital item, the second type of text altering being different than the first type of text altering;
    receiving a filter request for one or more annotations that are associated with the second type of text altering, the filter request specifying that the filter results are to be sent to a plurality of devices; and
    at least partly in response to receiving the filter request, obtaining results from a search of an annotations database, the results including the second annotation that is associated with the second type of text altering.

36. The method of claim 19, wherein the criteria includes at least one of the language of the annotation or digital item or the data format of the annotation.

* * * * *